(12) United States Patent
Berggren et al.

(10) Patent No.: US 10,016,935 B2
(45) Date of Patent: Jul. 10, 2018

(54) SPORT BALL CASING AND METHODS OF MANUFACTURING THE CASING

(71) Applicant: NIKE, Inc., Beaverton, OR (US)

(72) Inventors: Scott R. Berggren, Portland, OR (US); Scott W. Johnson, Beaverton, OR (US); Clayton J. Lindsay, Portland, OR (US); Vincent F. White, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/366,407

(22) Filed: Dec. 1, 2016

(65) Prior Publication Data

US 2017/0080639 A1    Mar. 23, 2017

Related U.S. Application Data

(60) Division of application No. 14/608,863, filed on Jan. 29, 2015, now Pat. No. 9,539,473, which is a division
(Continued)

(51) Int. Cl.
*A63B 41/08*  (2006.01)
*A63B 45/00*  (2006.01)
(Continued)

(52) U.S. Cl.
CPC ............ *B29C 66/133* (2013.01); *A63B 41/08* (2013.01); *A63B 45/00* (2013.01); *B29C 65/08* (2013.01);
(Continued)

(58) Field of Classification Search
CPC .. A63B 41/08; A63B 45/00; A63B 2243/0025
(Continued)

(56) References Cited

U.S. PATENT DOCUMENTS 1,890,566 A * 12/1932 Bartky ................... A63B 41/08
                                                               473/599
2,819,753 A *  1/1958 Nogue ................... B29D 22/00
                                                               156/145
(Continued)

FOREIGN PATENT DOCUMENTS

DE          19624020 C1     5/1997
EP          2072093 A1 *    6/2009
(Continued)

*Primary Examiner* — Steven Wong
(74) *Attorney, Agent, or Firm* — Quinn IP Law

(57) ABSTRACT

A method of making a spherical sport ball includes forming a casing having a first and a second substantially hemispherical panel component. The first panel component is a first unitary structure and has a first central panel, a first plurality of polygonal peripheral panels adjacent to the first central panel and having a first plurality of edges, and a plurality of flange areas extending from the first plurality of edges. The second panel component is a second unitary structure and has a second central panel and a second plurality of polygonal peripheral panels adjacent to the second central panel. The method includes joining together the first panel component and the second panel component at a non-linear, circumferential seam between the first and second plurality of polygonal peripheral panels. The method also includes forming a vertex between adjacent ones of the plurality of flange areas.

18 Claims, 26 Drawing Sheets

Related U.S. Application Data of application No. 13/434,890, filed on Mar. 30, 2012, now Pat. No. 8,974,330, which is a continuation-in-part of application No. 12/408,322, filed on Mar. 20, 2009, now Pat. No. 8,608,599.

(51) Int. Cl.

| | | |
|---|---|---|
| *B29C 65/00* | (2006.01) | |
| *B29C 65/08* | (2006.01) | |
| *B29C 65/24* | (2006.01) | |
| *B29C 65/30* | (2006.01) | |
| B29L 22/02 | (2006.01) | |
| B29L 31/54 | (2006.01) | |

(52) U.S. Cl.
CPC ............ *B29C 65/245* (2013.01); *B29C 65/30* (2013.01); *A63B 2209/00* (2013.01); *A63B 2243/0025* (2013.01); *B29L 2022/02* (2013.01); *B29L 2031/54* (2013.01); *Y10T 156/1043* (2015.01)

(58) Field of Classification Search
USPC .............. 473/603–605, 607, 596; D21/713
See application file for complete search history.

(56) References Cited

U.S. PATENT DOCUMENTS

| | | | | |
|---|---|---|---|---|
| 7,740,782 B2* | 6/2010 | Ou | .................. | A63B 41/08 264/241 |
| 8,608,599 B2* | 12/2013 | Raynak | .................. | A63B 41/08 473/605 |
| 8,974,330 B2* | 3/2015 | Berggren | ............... | A63B 41/08 473/604 |
| 2006/0229150 A1* | 10/2006 | Ou | .................. | A63B 41/08 473/604 |
| 2009/0005199 A1* | 1/2009 | Taniguchi | ............ | A63B 41/00 473/599 |
| 2009/0011878 A1* | 1/2009 | Ou | .................. | A63B 41/08 473/605 |
| 2009/0209374 A1* | 8/2009 | Ou | .................. | A63B 41/10 473/605 |
| 2011/0124448 A1* | 5/2011 | Ou | .................. | A63B 41/08 473/605 |
| 2011/0177895 A1* | 7/2011 | Lin | .................. | A63B 41/02 473/605 |
| 2012/0172160 A1* | 7/2012 | Marc | .................. | B29D 22/02 473/604 |
| 2012/0329587 A1* | 12/2012 | Ou | .................. | A63B 41/08 473/605 |
| 2013/0023365 A1* | 1/2013 | Idoni-Matthews | .... | A63B 43/00 473/570 |
| 2013/0053193 A1* | 2/2013 | Lo | .................. | A63B 41/04 473/604 |
| 2015/0202500 A1* | 7/2015 | Berggren | ............... | A63B 41/08 156/221 |

FOREIGN PATENT DOCUMENTS

| | | | | |
|---|---|---|---|---|
| GB | 2201281 A | * | 8/1988 | ............ G09B 27/08 |
| WO | 2010133305 A1 | | 11/2010 | |

\* cited by examiner

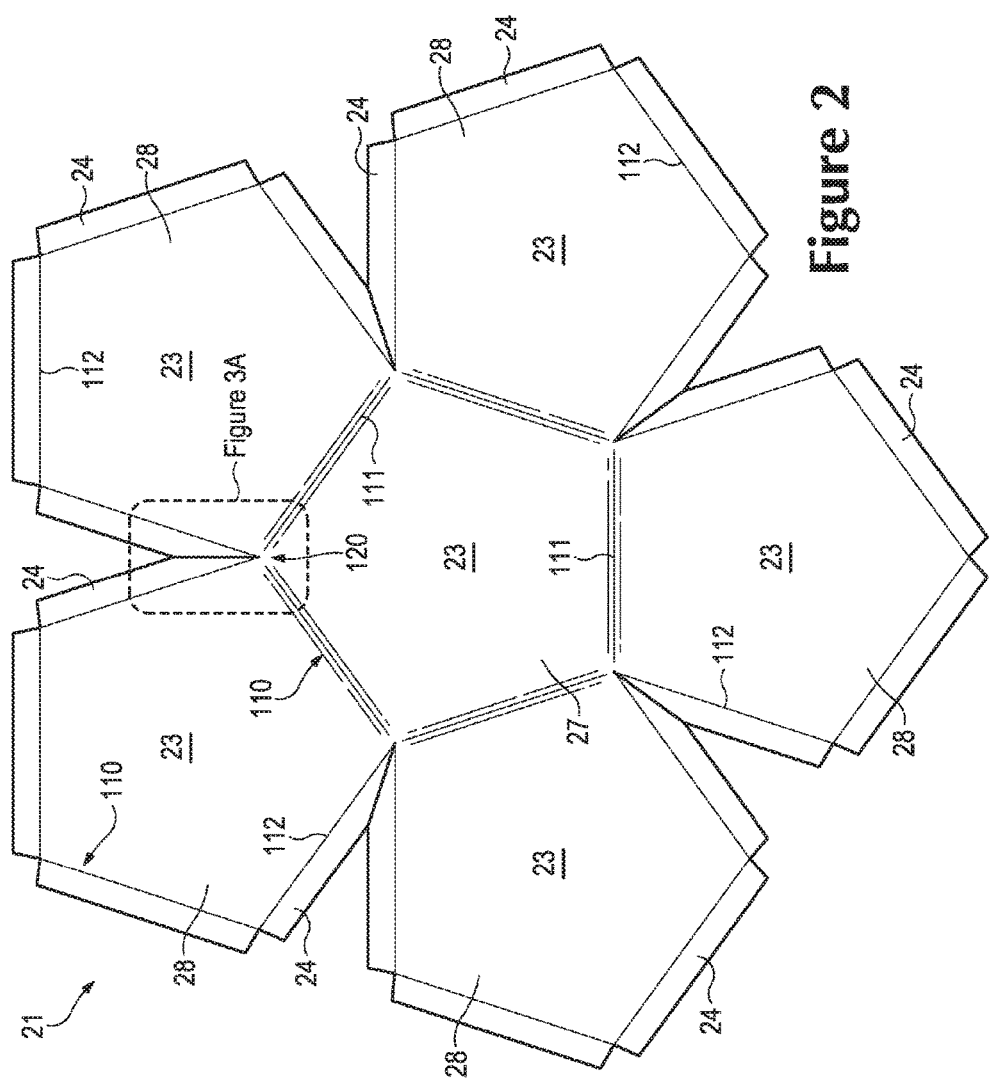

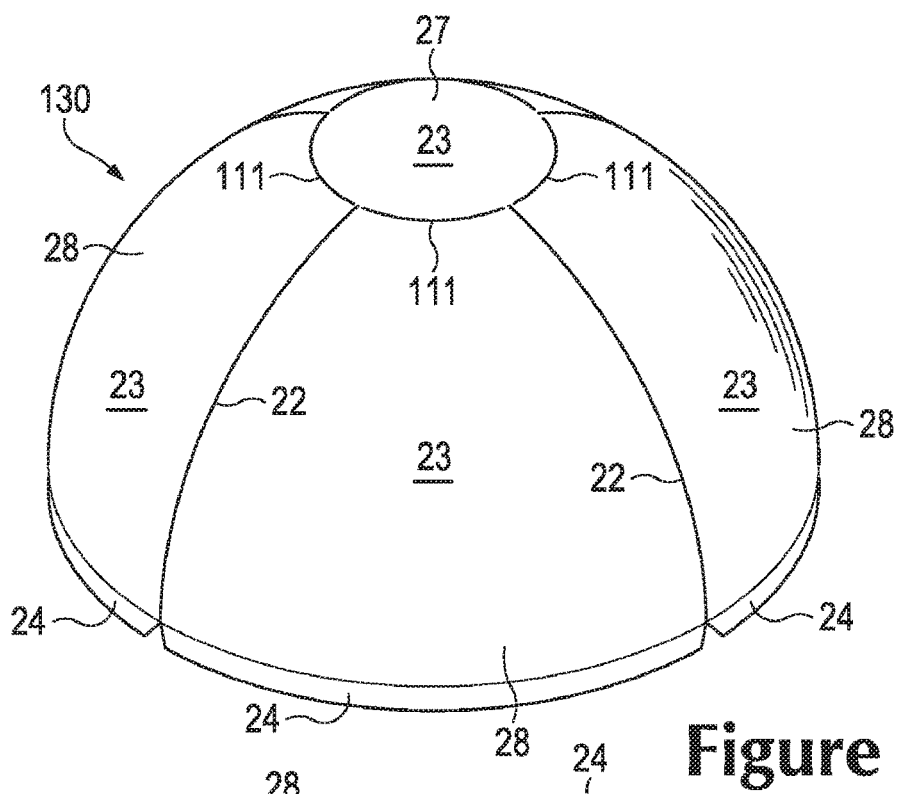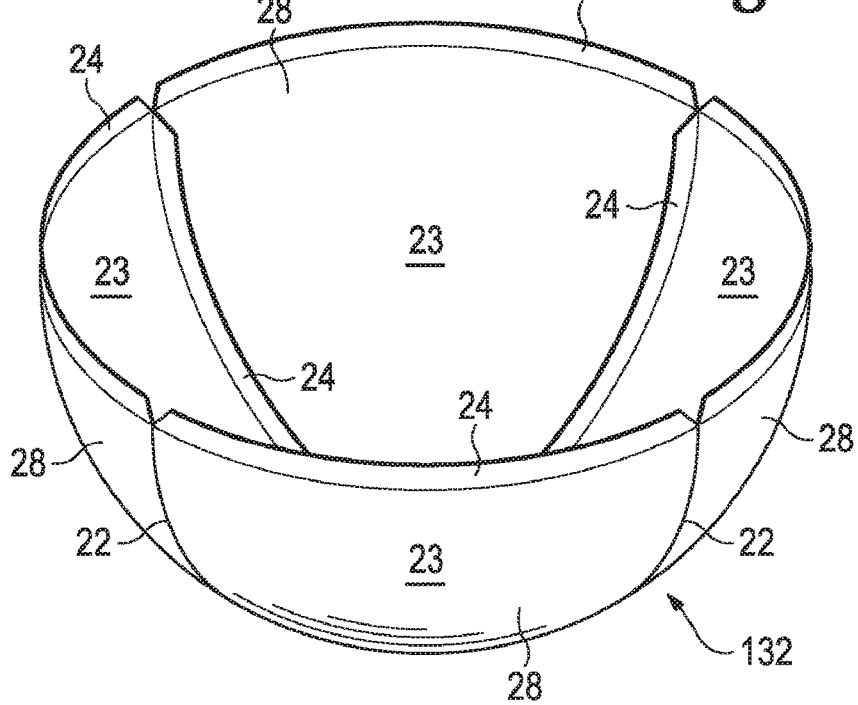
Figure 15B

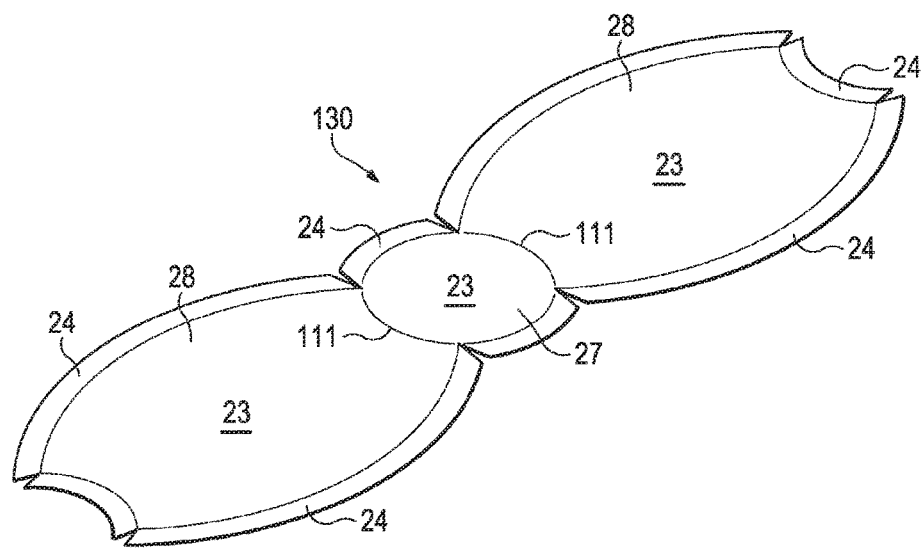
Figure 16A
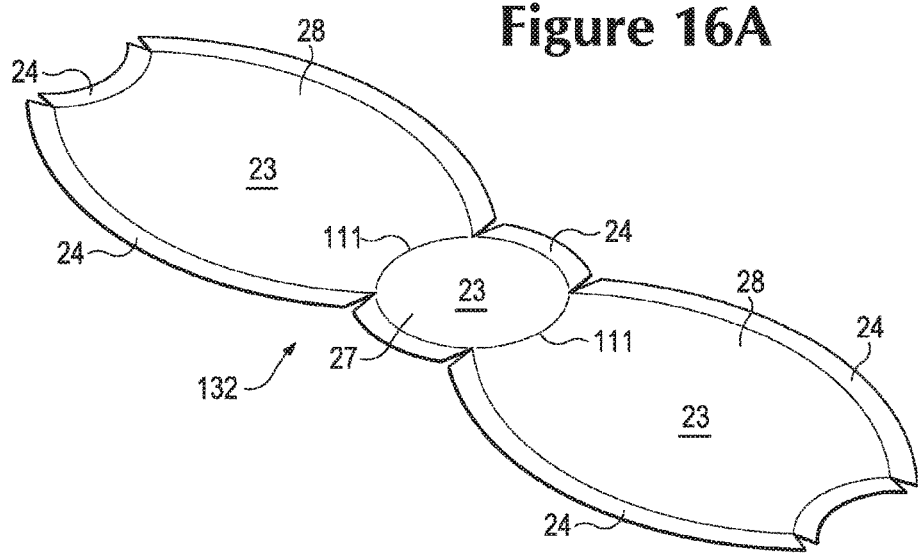

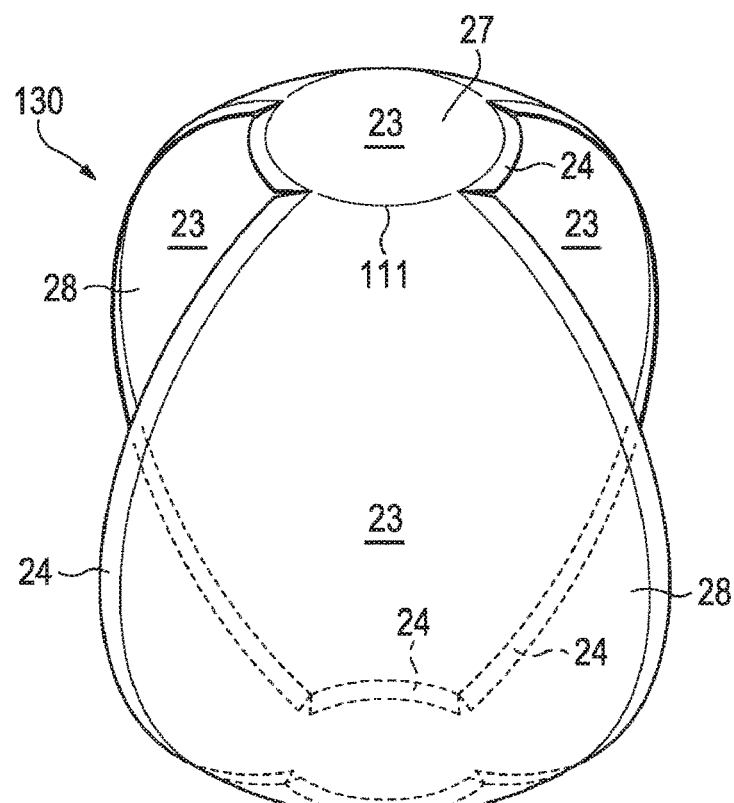
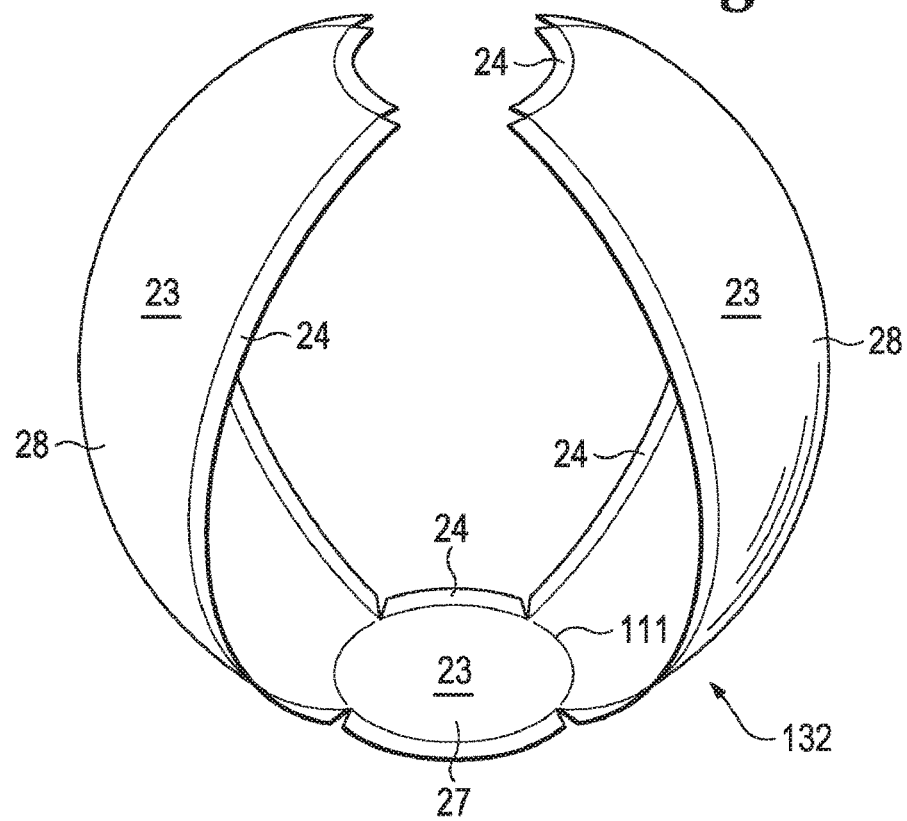
Figure 16B

SPORT BALL CASING AND METHODS OF MANUFACTURING THE CASING

CROSS-REFERENCE TO RELATED APPLICATION

This application is a divisional of U.S. patent application Ser. No. 14/608,863, filed on Jan. 29, 2015 and published on Jul. 23, 2015 as United States Patent Application Publication No. 2015/0202500, entitled "Sport Ball Casing and Methods of Manufacturing the Casing", the entire disclosure of which is incorporated herein by reference. U.S. patent application Ser. No. 14/608,863 is a divisional of U.S. patent application Ser. No. 13/434,890, filed on Mar. 30, 2012 and issued on Mar. 10, 2015 as U.S. Pat. No. 8,974,330, entitled "Sport Ball Casing and Methods of Manufacturing the Casing", the entire disclosure of which is incorporated herein by reference. U.S. patent application Ser. No. 13/434,890 is a continuation-in-part of U.S. application Ser. No. 12/408,322, filed on Mar. 20, 2009 and issued on Dec. 17, 2013 as U.S. Pat. No. 8,608,599, entitled "Sport Ball Casing and Methods of Manufacturing the Casing", the entire disclosure of which is incorporated herein by reference.

BACKGROUND

A variety of inflatable sport balls, such as a soccer ball, conventionally exhibit a layered structure that includes a casing, an intermediate layer, and a bladder. The casing forms an exterior portion of the sport ball and is generally formed from a plurality of durable and wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape. Other traditional-looking designs include a plurality of panels all having a pentagonal shape.

The intermediate layer forms a middle portion of the sport ball and is positioned between the casing and the bladder. Among other purposes, the intermediate layer may provide a softened feel to the sport ball, impart energy return, and restrict expansion of the bladder. In some configurations, the intermediate layer or portions of the intermediate layer may be bonded, joined, or otherwise incorporated into the casing as a backing material.

The bladder, which has an inflatable configuration, is located within the intermediate layer to provide an interior portion of the sport ball. In order to facilitate inflation (i.e., with pressurized air), the bladder generally includes a valved opening that extends through each of the intermediate layer and casing, thereby being accessible from an exterior of the sport ball.

It is desirable to reduce the complexity, and consequently the cost, of ball manufacturing procedures. In order to reduce the number of steps required to manufacture a soccer ball, for example, balls having a reduced number of panels have been developed. However, such balls have not maintained a traditional-looking soccer ball pattern. It would be desirable to provide a ball with a reduced complexity manufacturing procedure that maintains the look of a traditional or traditional-looking soccer ball.

SUMMARY

A method of making a spherical sport ball includes forming a casing having a first substantially hemispherical panel component and a second substantially hemispherical panel component. The first substantially hemispherical panel component is a first unitary structure and has a first central panel, a first plurality of polygonal peripheral panels adjacent to the first central panel and having a first plurality of edges, and a plurality of flange areas extending from the first plurality of edges. The second substantially hemispherical panel component is a second unitary structure and has a second central panel and a second plurality of polygonal peripheral panels adjacent to the second central panel. The method also includes joining together the first substantially hemispherical panel component and the second substantially hemispherical panel component at a non-linear, circumferential seam between the first plurality of polygonal peripheral panels and the second plurality of polygonal peripheral panels. The method further includes forming a vertex between adjacent ones of the plurality of flange areas.

In another embodiment, the method includes welding together the first substantially hemispherical panel component and the second substantially hemispherical panel component at a non-linear, circumferential seam between the first plurality of polygonal peripheral panels and the second plurality of polygonal peripheral panels such that adjacent ones of the plurality of flange areas abut one another. The method also includes impressing a plurality of elongated indentations in the first substantially hemispherical panel component to thereby form a first plurality of sides of the first central panel. The method further includes folding adjacent ones of the plurality of flange areas upon one another to thereby form a vertex between adjacent ones of the plurality of polygonal peripheral panels.

In an additional embodiment, a method of making a spherical sport ball includes forming a casing including a first panel component that has a first unitary structure and includes a first polygonal central panel and a first plurality of polygonal peripheral panels. The first plurality of polygonal peripheral panels are adjacent to the first polygonal central panels and have a plurality of flange areas. The method also includes forming a plurality of indentations in the casing, wherein each of the plurality of indentations forms a side of the first polygonal central panel and a boundary of one of the first plurality of polygonal peripheral panels. The method further includes joining together adjacent ones of the plurality of flange areas to be coextensive at a vertex between adjacent ones of the first plurality of polygonal peripheral panels.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

BRIEF DESCRIPTION OF THE DRAWINGS

The invention can be better understood with reference to the following drawings and description. The drawings are schematic and, therefore, the components in the figures are not necessarily to scale, emphasis instead being placed upon illustrating the principles of the invention. Moreover, in the figures, like reference numerals designate corresponding parts throughout the different views.

FIG. 2 is a top plan view of a panel component of the sport ball.

FIG. 15B is a perspective view of the panel components of FIG. 15A shaped into hemispherical components.

FIG. 16A is a perspective view of precut panel components having another alternative configuration.

FIG. 16B is a perspective view of the panel components of FIG. 16A shaped into hemispherical components.

DETAILED DESCRIPTION

The following discussion and accompanying figures disclose various sport ball configurations and methods relating to manufacturing of the sport balls. Although the sport ball is discussed and depicted in relation to a soccer ball, concepts associated with the configurations and methods may be applied to various types of inflatable sport balls. In addition to soccer balls, therefore, concepts discussed herein may be incorporated into basketballs, footballs (for either American football or rugby), volleyballs, and water polo balls, for example. A variety of non-inflatable sport balls, such as baseballs and softballs, may also incorporate concepts discussed herein.

Figure 1A:
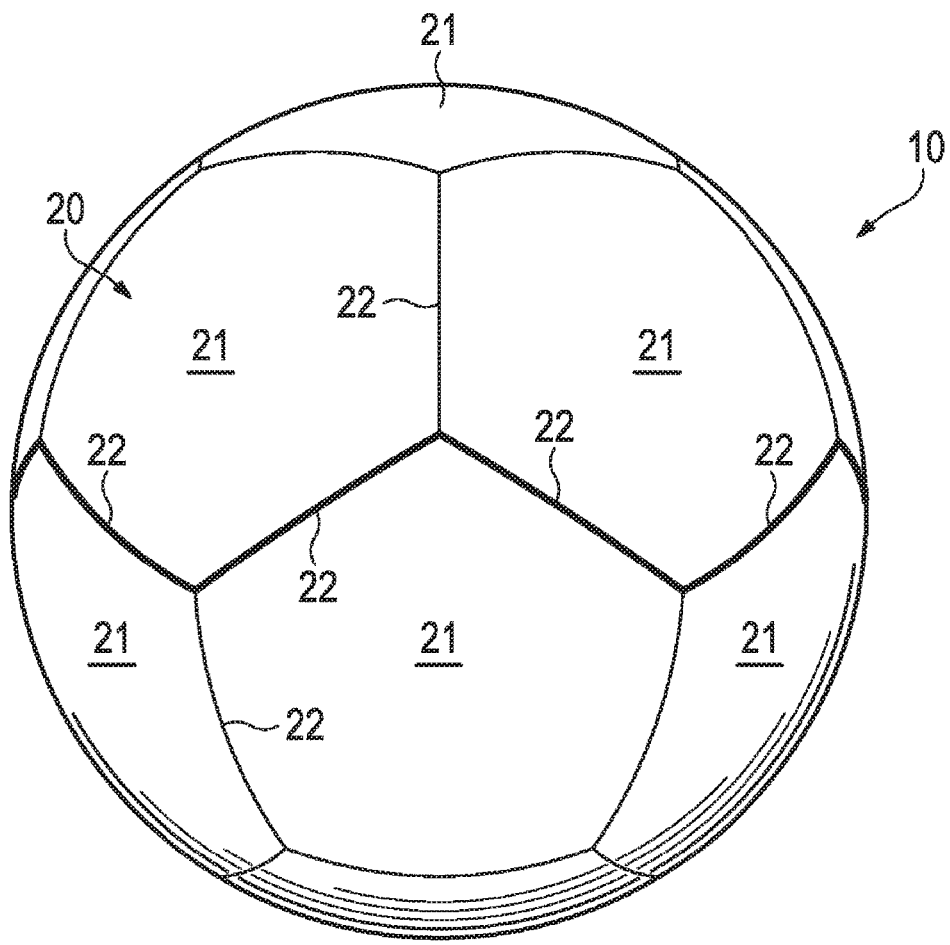
FIG. 1A is a perspective view of a sport ball.
Figure 1B:
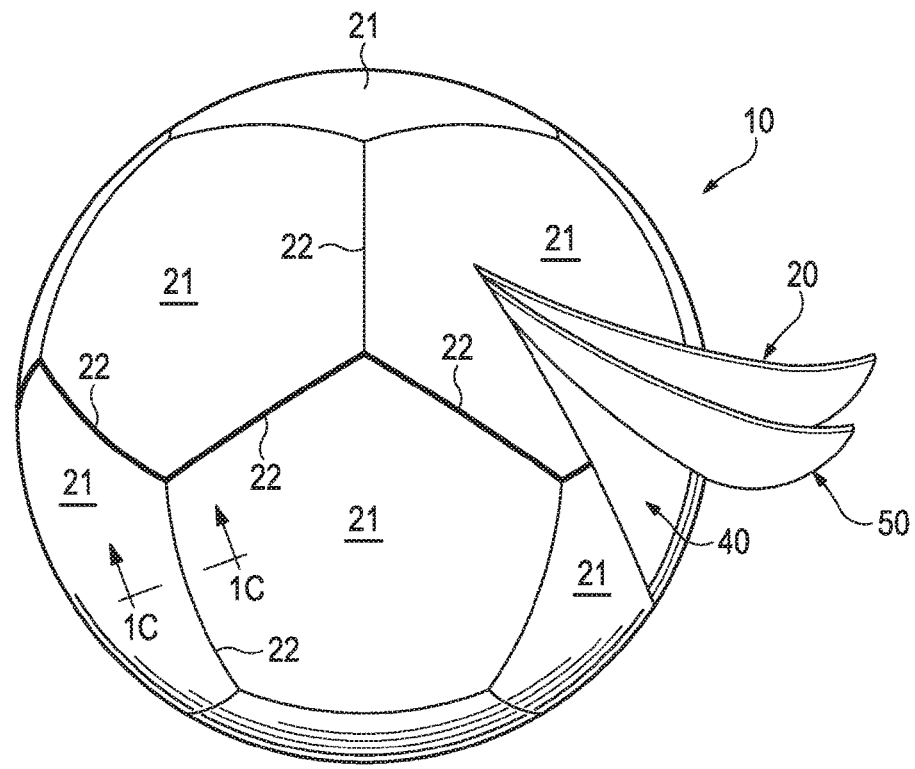
FIG. 1B is another perspective view of the sport ball.
Figure 1C:
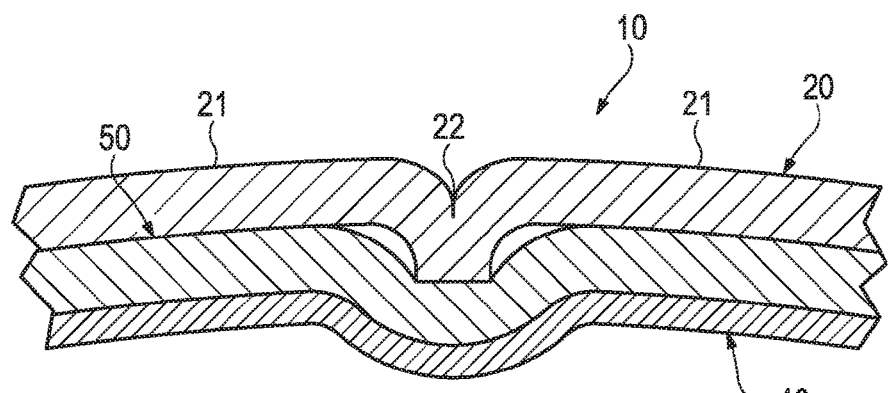
FIG. 1C is a cross-sectional view of a portion of the sport ball, as defined by section line 1C-1C in FIG. 1B.

A sport ball 10 having the general configuration of a soccer ball is depicted in FIGS. 1A-1C. Ball 10 exhibits a layered structure having (a) a casing 20 that forms an exterior portion of ball 10, (b) an intermediate layer 50 located within casing 20, and (c) an inflatable bladder 40 that forms an interior portion of ball 10. Upon pressurization, bladder 40 induces ball 10 to take on a substantially spherical shape. More particularly, pressure within bladder 40 causes bladder 40 to place an outward force upon intermediate layer 50. In turn, intermediate layer 50 places an outward force upon casing 20. In order to limit expansion of bladder 40 and also limit tension in casing 20, a portion of intermediate layer 50 may have a limited degree of stretch. In other words, bladder 40 places an outward force upon intermediate layer 50, but the stretch characteristics of intermediate layer 50 effectively prevent the outward force from inducing significant tension in casing 20. Accordingly, intermediate layer 50 restrains pressure from bladder 40, while permitting outward forces to induce a spherical shape in casing 20, thereby imparting a spherical shape to ball 10.

Casing 20 is formed from various panels 21 that are joined together along abutting sides or edges to form a plurality of seams 22. Although panels 21 are depicted as having the shapes of twelve equilateral pentagons, panels 21 may have non-equilateral shapes, concave or convex edges, or a variety of other shapes (e.g., triangular, square, rectangular, hexagonal, trapezoidal, round, oval, non-geometrical) that combine in a tessellation-type manner to form casing 20. In some configurations, ball 10 may have twelve pentagonal panels 21 and twenty hexagonal panels 21 to impart the general configuration of a traditional soccer ball. As discussed in greater detail below, in some configurations, selected panels 21 may also be formed of unitary (i.e., one piece) construction with adjacent panels 21 to form bridged panels that reduce the number of seams 22. Accordingly, the configuration of casing 20 may vary significantly.

When assembling casing 20, panels 21 may be joined to form seams 22 using any suitable technique. In some configurations, the panels may be joined with stitching (e.g., hand or machine stitching) in a conventional manner. In other configurations, panels 21 may be joined using an alternative method. For example, in some configurations, a welding process may be utilized in the manufacture of ball 10 to join panels 21 and form seams 22. More particularly, panels 21 may be at least partially formed from a polymer material, which may be a thermoplastic polymer material, and edges of panels 21 may be heated and bonded to each other to form seams 22. An example of the configuration of seams 22 is depicted in the cross-section of FIG. 1C, wherein the welding process has effectively secured, bonded, or otherwise joined two of panels 21 to each other by combining or intermingling the polymer material from each of panels 21. In some configurations, some of panels 21 may be joined through stitching or various welded seams 22 may be supplemented with stitching.

One advantage of utilizing a welding process to form seams 22 relates to the overall mass of ball 10. Whereas approximately ten to fifteen percent of the mass of a conventional sport ball may be from the seams between panels, welding panels 21 may reduce the mass at seams 22. By eliminating stitched seams in casing 20, the mass that would otherwise be imparted by the stitched seams may be utilized for other structural elements that enhance the performance properties (e.g., energy return, sphericity, mass distribution, durability, aerodynamics) of ball 10. Another advantage relates to manufacturing efficiency. Stitching each of the seams of a conventional sport ball is a relatively time-consuming process, particularly when hand stitching is utilized. By welding panels 21 together at seams 22, the time necessary for forming casing 20 may be decreased, thereby increasing the overall manufacturing efficiency.

As shown in FIGS. 1B and 1C, intermediate layer 50 may be positioned between casing 20 and bladder 40 and may be formed to include one or more of a compressible foam layer that provides a softened feel to the sport ball, a rubber layer that imparts energy return, and a restriction layer to restrict expansion of bladder 40. The overall structure of intermediate layer 50 may vary significantly. As an example, the restriction layer may be formed from (a) a thread, yarn, or filament that is repeatedly wound around bladder 40 in various directions to form a mesh that covers substantially all of bladder 40, (b) a plurality of generally flat or planar textile elements stitched together to form a structure that extends around bladder 40, (c) a plurality of generally flat or planar textile strips that are impregnated with latex and placed in an overlapping configuration around bladder 40, or (d) a substantially seamless spherically-shaped textile. In some configurations of ball 10, intermediate layer 50 or portions of intermediate layer 50 may also be bonded, joined, or otherwise incorporated into casing 20 as a backing material, or intermediate layer 50 may be absent from ball 10. Accordingly, the structure of intermediate layer 50 may vary significantly to include a variety of configurations and materials.

Bladder 40 has an inflatable configuration and is located within intermediate layer 50 to provide an inner portion of ball 10. When inflated, bladder 40 exhibits a rounded or generally spherical shape. In order to facilitate inflation, bladder 40 may include a valved opening (not depicted) that extends through intermediate layer 50 and casing 20, thereby being accessible from an exterior of ball 10, or bladder 40 may have a valveless structure that is semi-permanently inflated. Bladder 40 may be formed from a rubber or carbon latex material that substantially prevents air or other fluids within bladder 40 from diffusing to the exterior of ball 10. In addition to rubber and carbon latex, a variety of other elastomeric or otherwise stretchable materials may be utilized for bladder 40. Bladder 40 may also have a structure formed from a plurality of joined panels, as disclosed in U.S. patent application Ser. No. 12/147,943, filed in the U.S. Patent and Trademark Office on 27 Jun. 2008, which is entirely incorporated herein by reference.

In some configurations, casing 20 may be formed from two or more panel components, each panel component having a unitary structure and including a plurality of panels. For example, FIG. 2 illustrates an exemplary panel component 21, which, like panels 21 discussed above, may have a unitary structure and, when joined with other panels or panel components, may form a casing for ball 10. Panel component 21 may include a plurality of panel areas 23. For example, in some configurations, panel component 21 may include a central panel 27 and a plurality of peripheral panels 28.

The term "unitary structure" as used in this specification and claims, means that the component (e.g., panel component 21) is formed of a single sheet of casing material. It should be noted, however, that such a unitary structure may have multiple layers. The term "unitary structure" simply means that adjacent panels of a panel component have not been joined to one another, but rather, are formed from a continuous sheet of material. For example, forming panel component 21 may include cutting the entire panel component 21 from a single sheet of casing material. For example, in some cases, panel component 21 may be die cut. In other cases, panel component 21 may be cut using a manual or automated blade-type cutting device. For example, a robotic drag knife may be used to precisely, and repeatedly, cut panel components such as component 21 in a desired shape.

As shown in FIG. 2, in some configurations, central panel 27 and/or peripheral panels 28 may have polygonal shapes. For example, in some configurations, central panel 27 and/or peripheral panels 28 may have pentagonal shapes, as shown in FIG. 2. In other configurations, central panel 27 and/or peripheral panels may have other polygonal shapes, for example triangular, rectangular, hexagonal, or any other suitable shape. In some configurations, central panel 27 may have the same polygonal shape as peripheral panels 28. In other configurations, central panel 27 and peripheral panels 28 may have differing polygonal shapes. Further, in some configurations, peripheral panels 28 may all have the same polygonal shape, whereas, in other configurations, peripheral panels 28 may have differing polygonal shapes. Also, in some configurations, central panel 27 and/or one or more of peripheral panels 28 may have a convex polygonal shape. In some configurations, central panel 27 and/or one or more of peripheral panels 28 may have a regular polygonal shape (equal sides and angles).

In some configurations, panel component 21 may include one or more elongated indentations 110 in casing 20. Exemplary methods of forming indentations 110 may include applying compression and heat to elongate regions of casing 20. Such methods as well as exemplary indentation configurations are described below in greater detail.

As shown in FIG. 2, in some configurations, panel component 21 may include elongated indentations 111 in casing 20 that define sides of central panel 27. Indentations 111 may also define sides of peripheral panels 28 that are adjacent to central panel 27. Indentations 111 may be configured and arranged to resemble seams between panels of a pentagonal panel pattern. For example, indentations 111 may be arranged to resemble seams between central panel 27 and peripheral panels 28. In some configurations, pentagonal peripheral panels 28 may be oriented with a vertex pointed in a direction extending radially away from a center of central panel 27, as shown in FIG. 2.

As also shown in FIG. 2, panel component 21 may also include indentations 112 defining flange areas 24 that form edge portions of peripheral panels 28. As noted above, in some configurations, casing 20 may be at least partially formed from a polymer material, which may be a thermoplastic polymer material, which can be joined through a welding process. As shown in FIG. 2, peripheral panels 28 may include flange areas 24. Flange areas 24 may be included to facilitate joining peripheral panels 28 to one another. In addition, flange areas 24 may be included to facilitate joining peripheral panels to other panels, as will be described in greater detail below.

As shown in FIG. 2, Flange areas 24 may form edge portions of peripheral panels 28. For example, peripheral panels 28 are depicted as each having a pentagonal shape and each of flange areas 24 correspond with a side region of the pentagonal shape. In further configurations where a panel has a different shape, the number of flange areas may change to correspond with the number of sides of the shape.

Figure 3A:
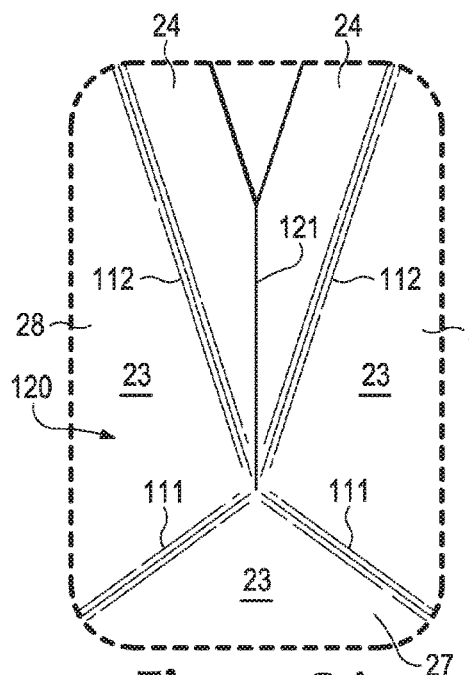
FIG. 3A is an enlarged view of a portion of the panel component shown in FIG. 2.

Flange areas 24 may have various configurations in a vertex region 120 shown in FIG. 2. FIGS. 3A-3D illustrate exemplary configurations of flange areas 24. FIG. 3A is an enlarged view of vertex region 120 in the configuration shown in FIG. 2. As shown in FIG. 3A, flange areas 24 may converge in vertex region 120. In some configurations, the most radially inward portions of flange areas 24 (closest to the center of central panel 27) may abut one another, and thus may be separated by a slit 121, as shown in FIG. 3A.

Slit 121 may be made, for example, as part of the cutting procedure performed to form panel component 21.

Figure 3B:
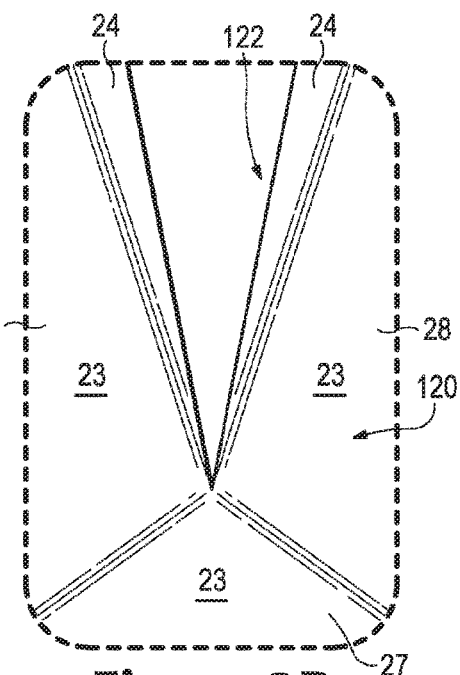
FIGS. 3B-3D are enlarged views of alternative configurations for the portion of the panel component shown in FIG. 3A.

FIG. 3B shows an alternative configuration of vertex region 120. As shown in FIG. 3B, in some configurations, flange areas 24 of adjacent peripheral panels 28 may taper, in a tapered portion 122, to a vertex between the adjacent peripheral panels 28 in vertex region 120. Tapered portion 122 may extend the entire length of flange areas 24 or may extend only a partial length of flange areas 24.

Figure 3C:
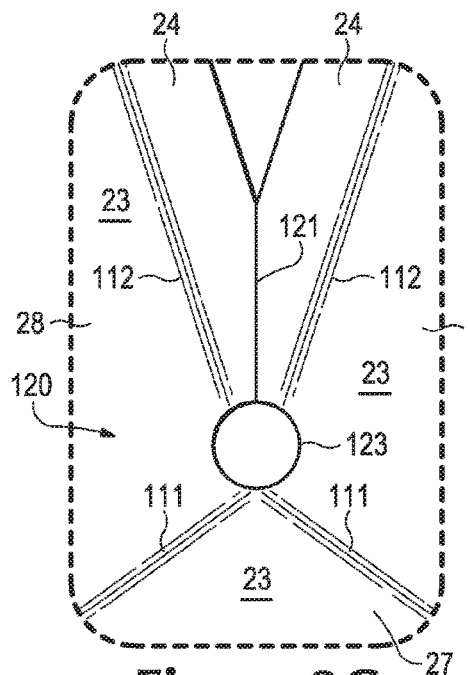

FIG. 3C shows another alternative configuration of vertex region 120. As shown in FIG. 3C, in some configurations, the intersection of flange areas of adjacent peripheral panels 28 may terminate at a stress relief opening 123 at a vertex between the adjacent peripheral panels 28. Stress relief opening 123 may prevent tearing of casing 20 in vertex region 120.

Figure 3D:
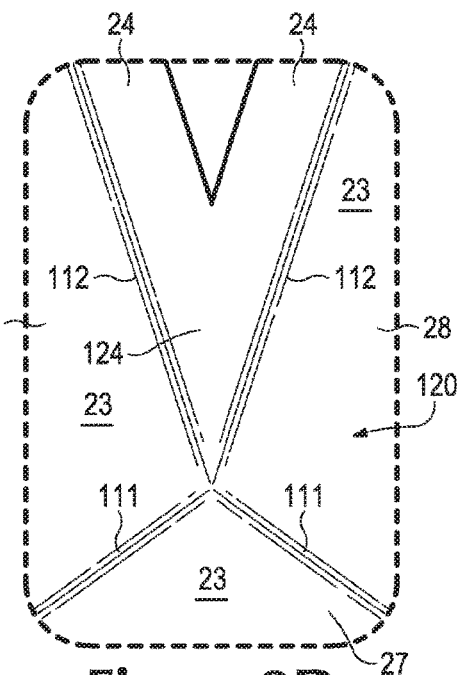

FIG. 3D shows another alternative configuration of vertex region 120. As shown in FIG. 3D, in some configurations, flange areas 24 of adjacent peripheral panels 28 may be coextensive at a vertex between the adjacent peripheral panels 28. Accordingly, an uncut region 124 may be provided adjoining adjacent flange areas 24, as shown in FIG. 3D. The configuration shown in FIG. 3D may provide a folded portion when flange areas 24 of adjacent peripheral panels 28 are joined, thereby providing a fully sealed seam, without any openings in vertex region 120. The method of joining flange areas 24 having the configuration shown in FIG. 3D is discussed in greater detail below.

Panel component 21 may be joined with one or more additional panels to form the casing 20 of ball 10. In some configurations, the additional panel or panels may have a different configuration than panel component 21. In other configurations, the additional panel or panels may have the same or substantially the same shape (and in some cases the same configuration) as panel component 21. In some configurations ball 10 may be spherical. In such configurations, panel component 21 may be configured to form a portion of a spherical casing 20. For example, in some configurations, panel component 21 may, when adjacent peripheral panels 28 are joined to one another, form an arcuate shell that forms part of a spherical casing 20. In some configurations, panel component 21 may be configured to form an approximately half spherical shell. That is, when formed into an arcuate shell, panel component 21 may define a surface area that approximates half of a spherical surface. In some configurations, such a half spherical shell may have a hemispherical or substantially hemispherical shape. In other embodiments, such a half spherical shell may have a shape that is distinguishable from a hemispherical shape. In still other configurations, panel component 21 may form a curved portion of a non-spherical ball (e.g., an American football).

Figure 4:
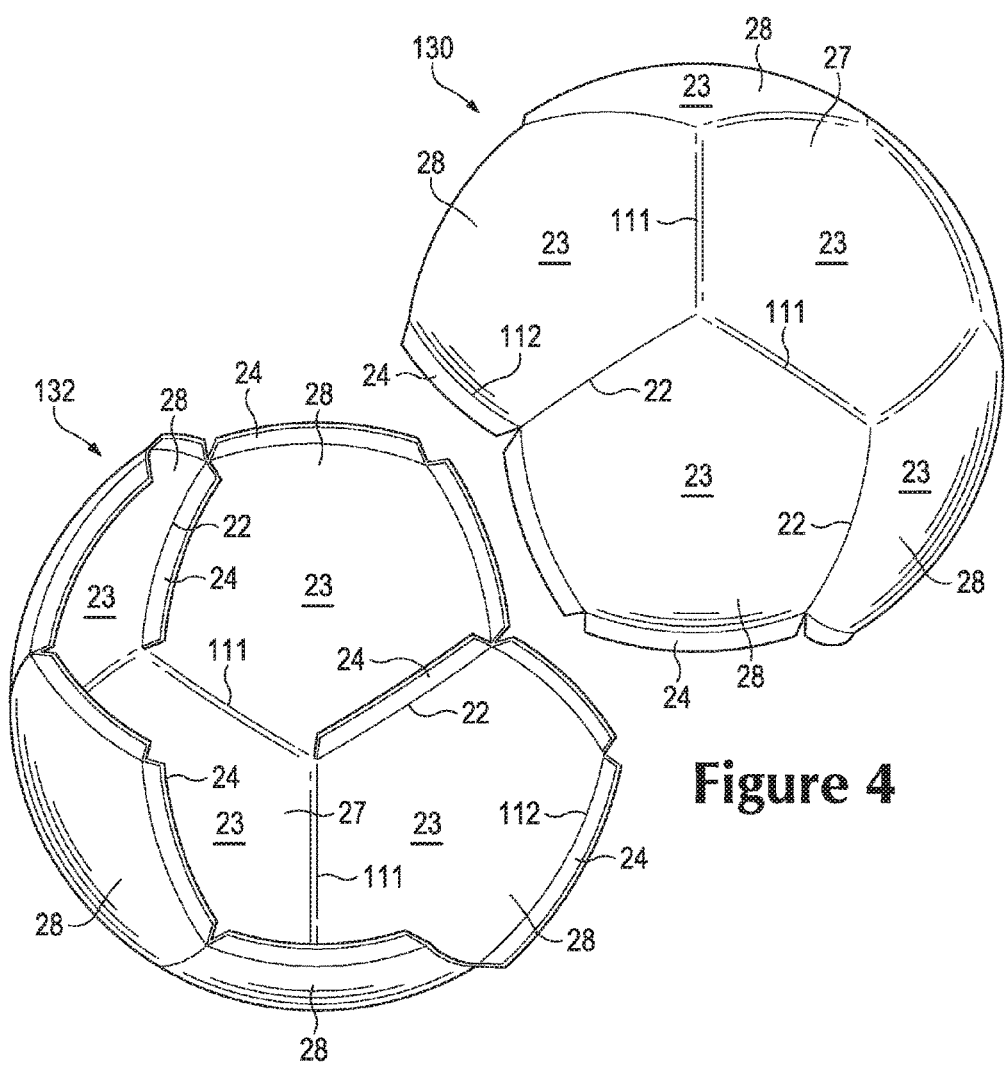
FIG. 4 shows two panel components arranged to form substantially hemispherical shells.

FIG. 4 illustrates a configuration including a first substantially hemispherical panel component 130 and a second substantially hemispherical panel component 132, which may be joined to form a spherical casing 20 of ball 10. Each of panel components 130 and 132 may be formed from a panel component having a configuration like panel component 21 shown in FIGS. 2 and 4. First panel component 130 and second panel component 132 are described as "substantially hemispherical" because, although components 130 and 132 each form a shell that comprises approximately one half of the surface area of ball 10, the seam between components 130 and 132 may not be linear. For example, in the configuration shown in FIG. 4, peripheral panels 28 are oriented with vertices pointed away from the centers of components 130 and 132. Thus, when joined, the peripheral panels 28 of panel component 130 interweave alternately with the peripheral panels 28 of panel component 132, resulting in a circumferential, but non-linear, seam between panel component 130 and panel component 132.

In some configurations, first substantially hemispherical panel component 130 and second substantially hemispherical panel component 132 may have substantially the same configuration, as shown in FIG. 4. For example, in some configurations, panel component 130 and panel component 132 may have an identical construction except that one of the panel components may include a valve or valve opening to permit inflation of ball 10.

As shown in FIG. 4, flange areas 24 forming the edge portions of peripheral panels 28 of panel component 130 may be joined to flange areas 24 of adjacent peripheral panels 28 of panel component 130 to create seams 22. Similarly, flange areas 24 forming the edge portions of peripheral panels 28 of panel component 132 may be joined to flange areas 24 of adjacent peripheral panels 28 of panel component 130. By joining adjacent peripheral panels 28 of a panel component, a substantially hemispherical configuration may be achieved, as shown in FIG. 4. In addition, peripheral panels 28 of panel component 130 may be joined to peripheral panels 28 of panel component 132 to form a spherical casing 20, as will be described in greater detail below.

By forming casing 20 of ball 10 from panel components 130 and 132, each including a center panel 27 and peripheral panels 28, numerous manufacturing steps may be eliminated. In particular, each panel component 130,132 replaces six panels. Indentations 111 defining central panel 27 represent five seams that do not have to be formed during manufacturing. Considering the illustrated configuration, because ball 10 may include two or more panel components, ten or more seams may be eliminated from the manufacturing process. In order to maintain the appearance of traditional pentagonal panels, indentations may be formed in casing 20 during the manufacturing process, however, forming indentations may be a less complicated and/or less expensive manufacturing process than forming seams by joining separate panels. In addition, eliminating seams may increase the strength of casing 20.

Figure 5:
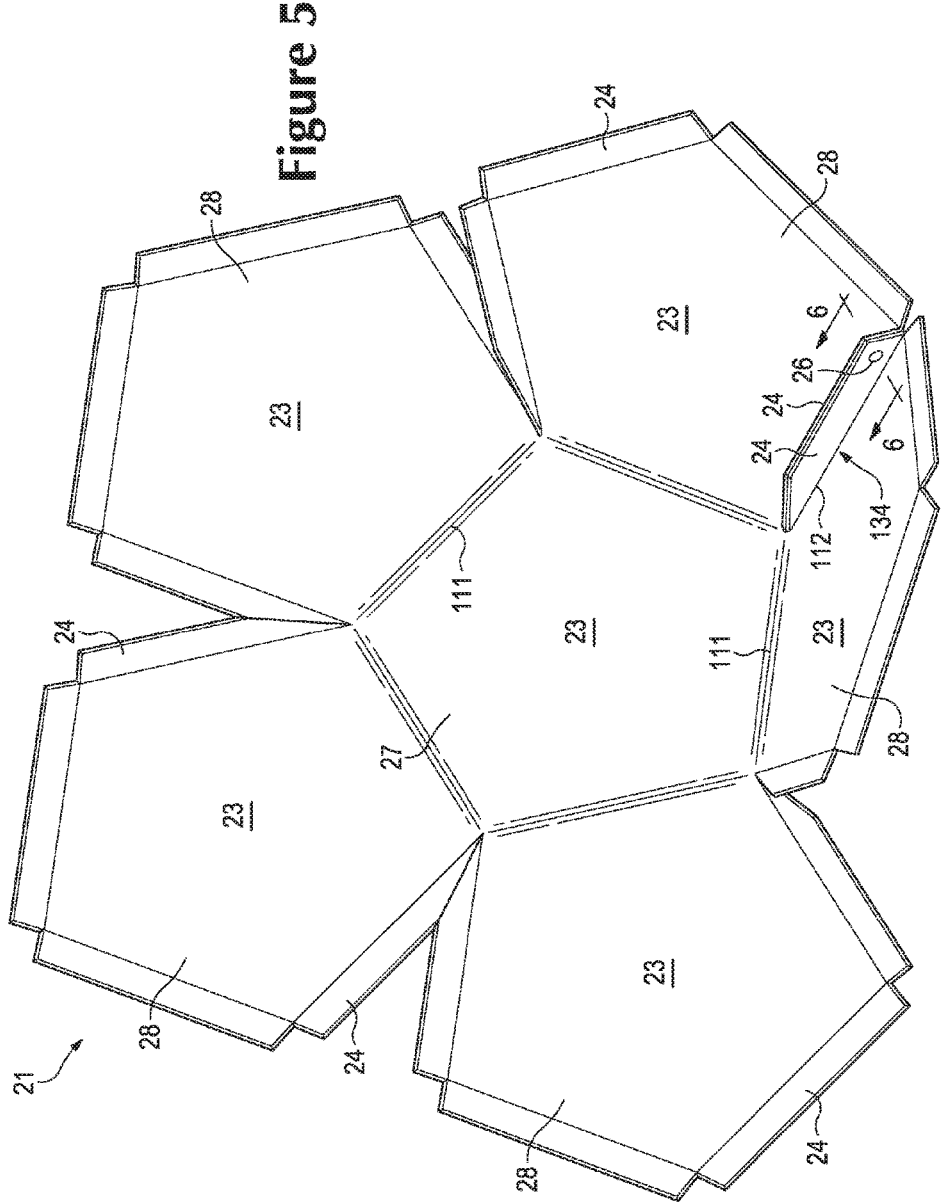
FIG. 5 is a perspective view of a panel component having two joined peripheral panels.
Figure 6:
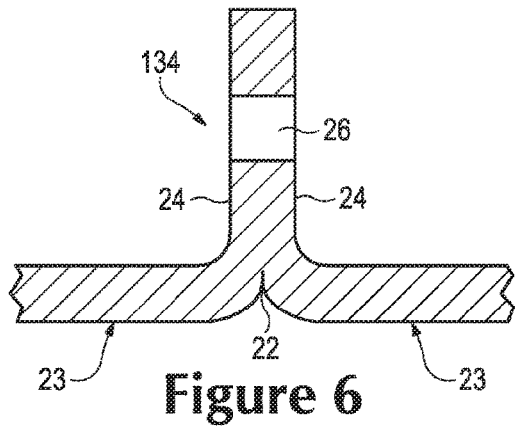
FIG. 6 is a cross-sectional view of the joined panels, as defined by section line 6-6 in FIG. 5.

Panels 28 may be joined to one another in any suitable manner. For example, in some configurations, panels 28 may be joined using stitching and/or adhesive. In other configurations, panels 28 may be joined using welding. Referring to FIGS. 5 and 6, an example of the manner in which two peripheral panels 28 may be joined to each other is depicted. In order to join adjacent panel areas 23 that are generally co-planar with each other, the flange areas 24 of adjacent panel areas 23 may be bent with respect to panel areas 23. Bending of flange areas 24 relative to panel areas 23 may be facilitated by indentations 112 separating panel areas 23 and flange areas 24, which may act as a living hinge. With flange areas 24 bent, surfaces of flange areas of adjacent panel areas 23 may be abutted to one another. Once these surfaces are abutted, flange areas 24 of adjacent panel areas 23 may be joined along the abutting surfaces, thus forming joined flange areas 134, which may form seams 22 of ball 10.

Note that the upwardly-facing surfaces in FIGS. 5 and 6 are located on an interior of ball 10 once manufacturing is completed, and downwardly-facing surfaces in FIGS. 5 and 6 form an exterior surface of ball 10. As shown in FIG. 5, joining adjacent peripheral panels 28 of the same panel component 21 may result in bending or curving in of peripheral panels 28 relative to central panel 27, thus forming the rounded surface of a sphere. As discussed in greater detail below, portions of the joined flange areas 134 (e.g., excess material) may be trimmed during the manufacturing process for casing 20.

In some configurations, at least some of flange areas 24 may define various registration apertures 26 that form holes extending through peripheral panels 28. Registration apertures 26 from flange areas 24 of adjacent peripheral panels 28 may be aligned in order to facilitate the bonding of the adjacent peripheral panels 28. By aligning registration apertures 26 prior to bonding (i.e., through welding), flange areas 24 may be positioned relative to each other accurately and reliably.

Casing 20 is discussed above as including a polymer material, which may be utilized to secure peripheral panels 28 to each other. Examples of suitable polymer materials for casing 20 may include thermoplastic and/or thermoset polyurethane, polyamide, polyester, polypropylene, and polyolefin. In some configurations, casing 20 may incorporate filaments or fibers that reinforce or strengthen casing 20. In further configurations, casing 20 may have a layered structure that includes an outer layer of the polymer material and an inner layer formed from a textile, polymer foam, or other material that is bonded with the polymer material.

When exposed to sufficient heat, the polymer materials within casing 20 transition from a solid state to either a softened state or a liquid state, particularly when a thermoplastic polymer material is utilized. When sufficiently cooled, the polymer materials then transition back from the softened state or the liquid state to the solid state. Based upon these properties of polymer materials, welding processes may be utilized to form a weld that joins portions of peripheral panels 28 (i.e., flange areas 24) to each other. As utilized herein, the term "welding" or variants thereof is defined as a securing technique between two elements that involves a softening or melting of a polymer material within at least one of the elements such that the materials of the elements are secured to each other when cooled. Similarly, the term "weld" or variants thereof is defined as the bond, link, or structure that joins two elements through a process that involves a softening or melting of a polymer material within at least one of the elements such that the materials of the elements are secured to each other when cooled. As examples, welding may involve (a) the melting or softening of two panels 21 that include polymer materials such that the polymer materials from each panel 21 intermingle with each other (e.g., diffuse across a boundary layer between the polymer materials) and are secured together when cooled and (b) the melting or softening a polymer material in a first panel 21 such that the polymer material extends into or infiltrates the structure of a second panel 21 (e.g., infiltrates crevices or cavities formed in the second panel 21 or extends around or bonds with filaments or fibers in the second panel 21) to secure the panels 21 together when cooled. Welding may occur when only one panel 21 includes a polymer material or when both panels 21 include polymer materials. Additionally, welding does not generally involve the use of stitching or adhesives, but involves directly bonding panels 21 to each other with heat. In some situations, however, stitching or adhesives may be utilized to supplement the weld or the joining of panels 21 through welding.

Figure 7:
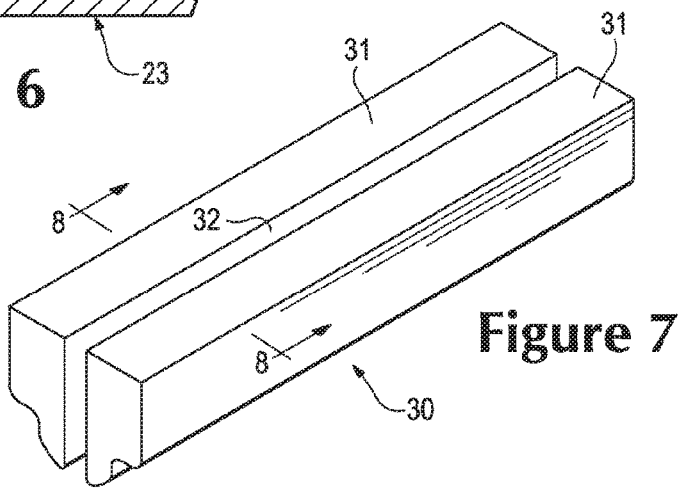
FIG. 7 is a perspective view of a welding tool utilized in joining the panels.
Figure 8:
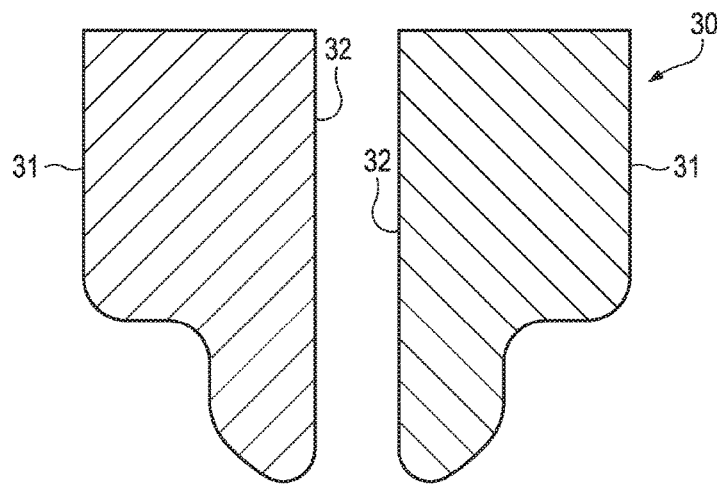
FIG. 8 is a cross-sectional view of the welding tool, as defined by section line 8-8 in FIG. 7.

A variety of techniques may be utilized to weld flange areas 24 to each other, including conduction heating, radiant heating, radio frequency (RF) heating, ultrasonic heating, and laser heating. An example of a welding die 30 that may be utilized to form seams 22 by bonding two flange areas 24 is depicted in FIGS. 7 and 8. Welding die 30 includes two portions 31 that generally correspond in length with a length of one of the sides of panels 21. That is, the length of welding die 30 is generally as long as or longer than the lengths of flange areas 24. Each portion 31 also defines a facing surface 32 that faces the other portion 31. That is, facing surfaces 32 face each other. If utilized for purposes of conduction heating, for example, portions 31 may each include internal heating elements or conduits that channel a heated liquid in order to sufficiently raise the temperature of welding die 30 to form a weld between flange areas 24. If utilized for purposes of radio frequency heating, one or both of portions 31 may emit radio frequency energy that heats the particular polymer material within panels 21. In addition to welding die 30, a variety of other apparatuses that may effectively form a weld between panels 21 may be utilized.

Figure 9A:
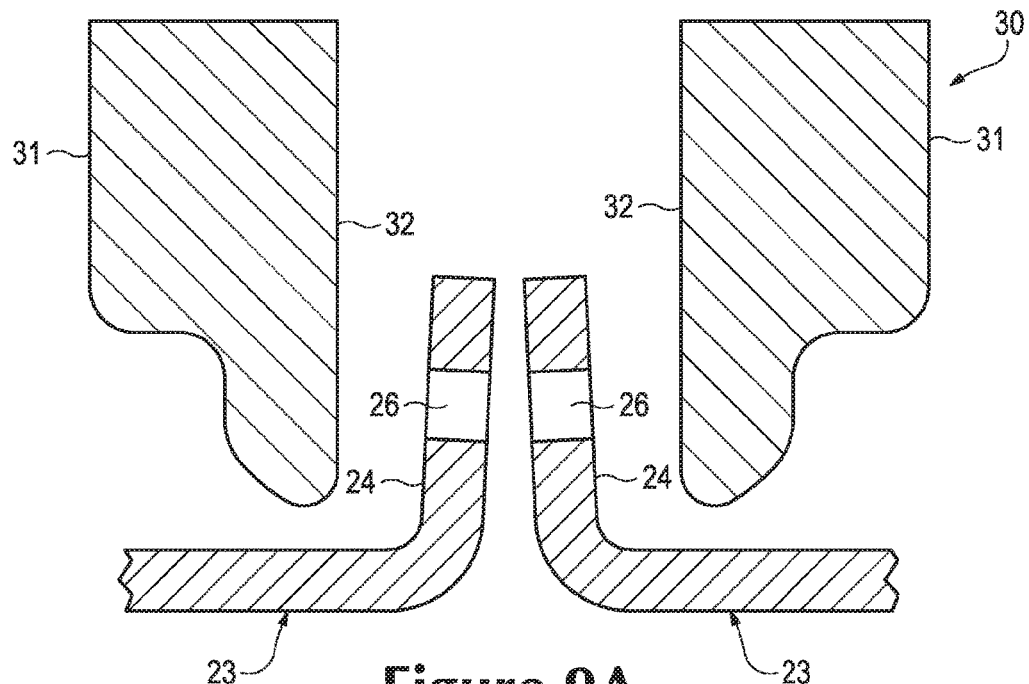
FIGS. 9A-9E are schematic cross-sectional views depicting steps of welding the panels together in a manufacturing process for the sport ball.
Figure 9B:
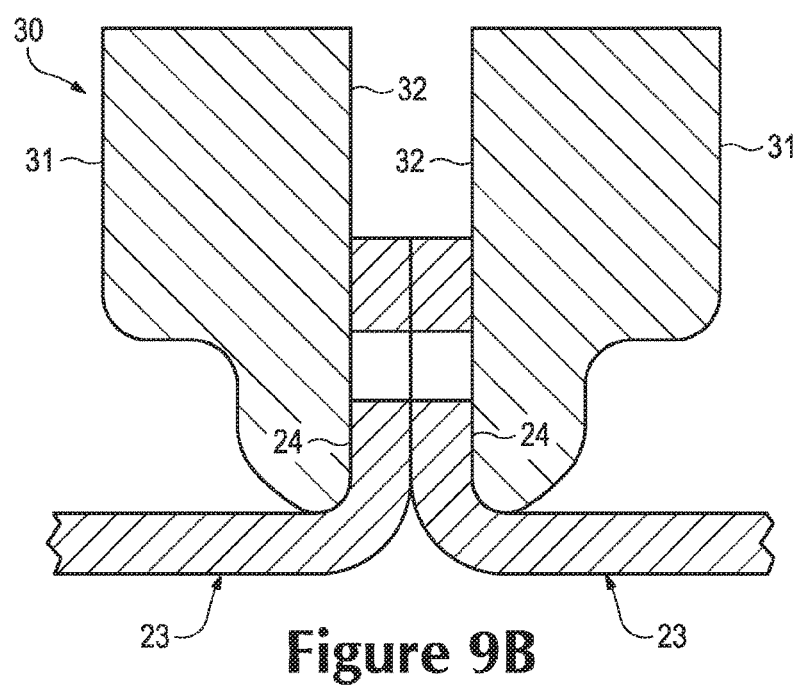
Figure 9C:
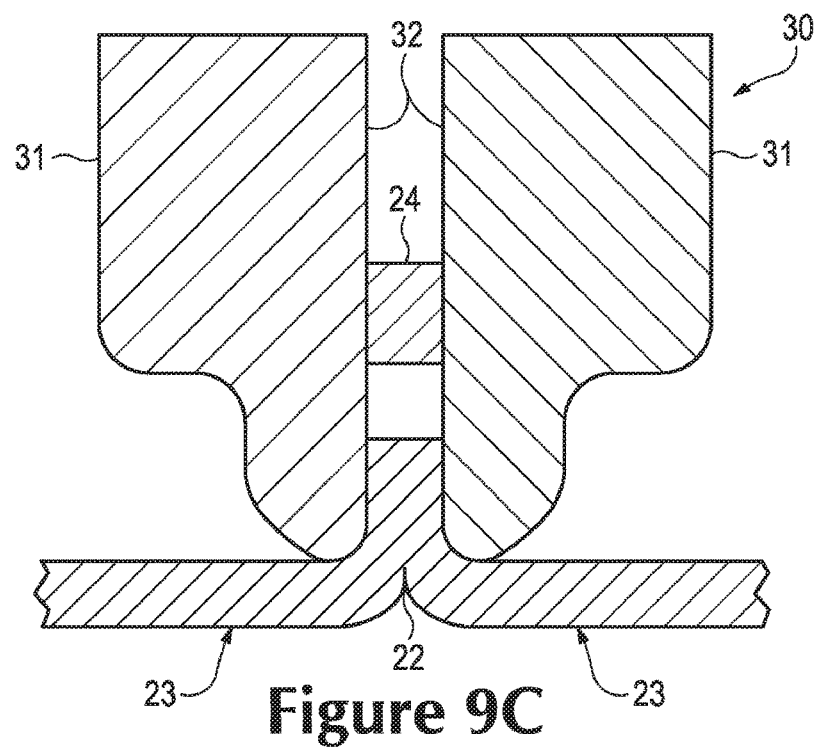
Figure 9D:
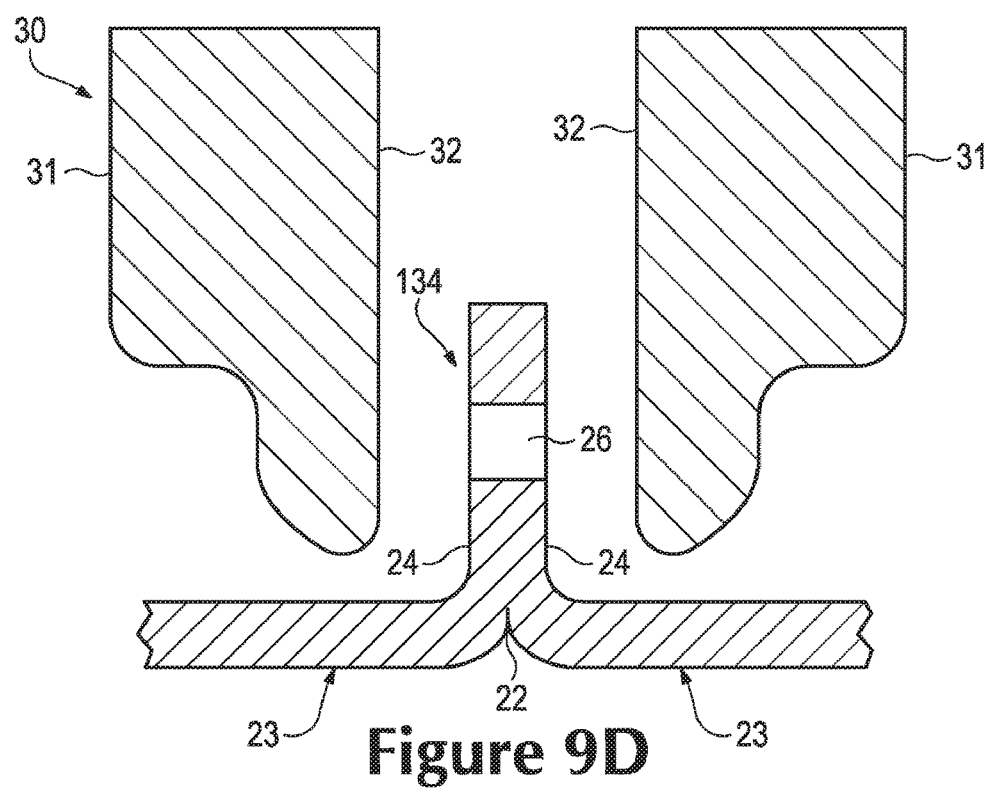
Figure 9E:
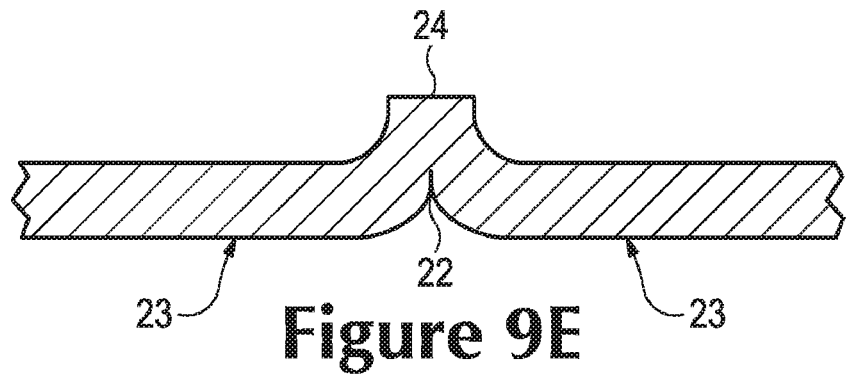

A general process for joining panels 21 with welding die 30 will now be discussed with reference to FIGS. 9A-9F. Initially, adjacent flange areas from two panels 21 are located such that (a) surfaces of the flange areas face each other and (b) registration apertures 26 are generally aligned, as depicted in FIG. 9A. Portions 31 of welding die 30 are also located on opposite sides of the abutting flange areas 24. Portions 31 then compress flange areas 24 together between facing surfaces 32 to cause surfaces of flange areas 24 to contact each other, as depicted in FIG. 9B. By heating flange areas 24 with welding die 30, the polymer materials within flange areas 24 melt or otherwise soften to a degree that facilitates welding between flange areas 24, as depicted in FIG. 9C, thereby forming seam 22 between panels 21. Once seam 22 is formed by bonding flange areas together, portions 31 may retract from flange areas 24, as depicted in FIG. 9D. Excess portions of flange areas 24, which may include portions that define registration apertures 26, are then trimmed or otherwise removed to complete the formation of one of seams 22, as depicted in FIG. 9E.

Figure 9F:
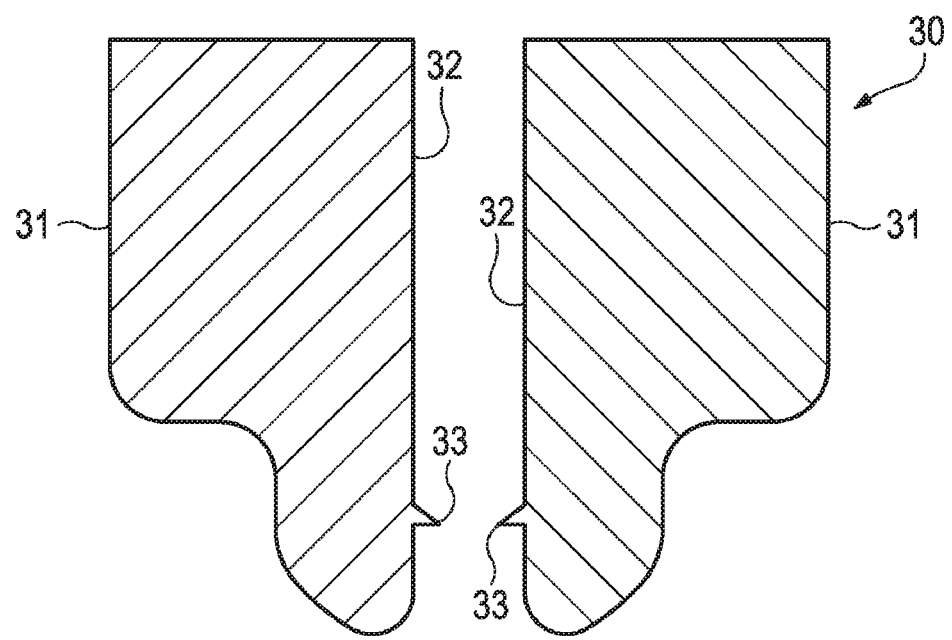
FIG. 9F is a cross-sectional view that corresponds with FIG. 8 and depicts another configuration of the welding tool.

A variety of trimming processes may be utilized to remove the excess portions of flange areas 24. As examples, the trimming processes may include the use of a cutting apparatus, a grinding wheel, or an etching process. As another example, welding die 30 may incorporate cutting edges 33, as depicted in FIG. 9F, that trim flange areas 24 during the welding process. That is, cutting edges 33 may be utilized to protrude through flange areas 24 and effectively trim flange areas 24 as portions 31 heat and compress flange areas 24 together between facing surfaces 32.

Figure 10:
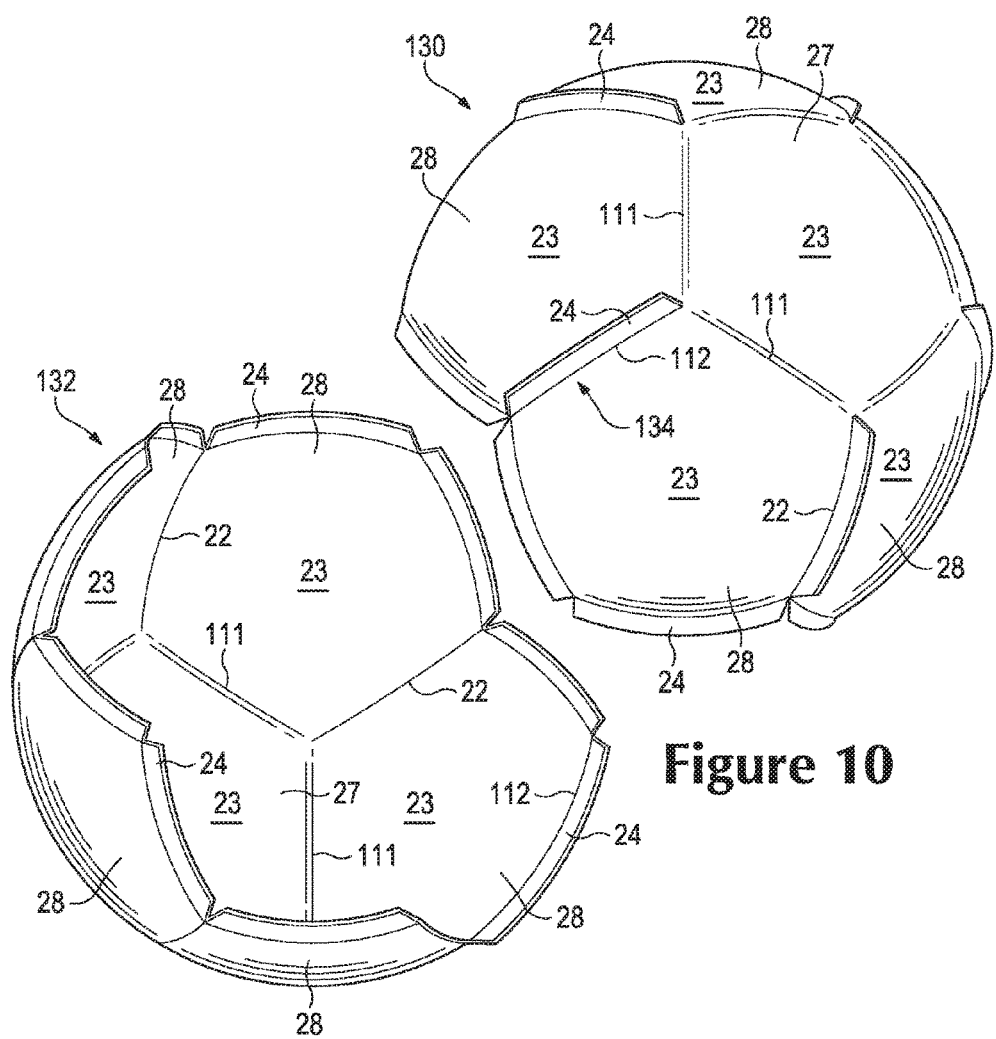
FIG. 10 shows the substantially hemispherical panel components of FIG. 4 oriented inside-out.

The general process of welding flange areas 24 to form seams 22 between panels 21 was generally discussed above relative to FIGS. 9A-9F. This general process may be repeatedly performed with multiple peripheral panels 28, on multiple flange areas 24 of each peripheral panel 28, to effectively form substantially hemispherical panel components 130 and 132, as shown in FIG. 10. It will be noted that, panel components 130 and 132 are shown in FIG. 10 as being inside-out. Although hemispherical panel components 130 and 132 may be formed by joining adjacent peripheral panels 28 while panel components 130 and 132 are oriented right-side-out, increased access to flange areas 24 may be provided during the joining procedure by orienting the panels inside-out. Further, regardless of how the hemispherical panels are oriented during the formation of the hemispherical panels, the hemispherical panels may be turned inside-out in order to facilitate the joining of the panels to one another.

Figure 11A:
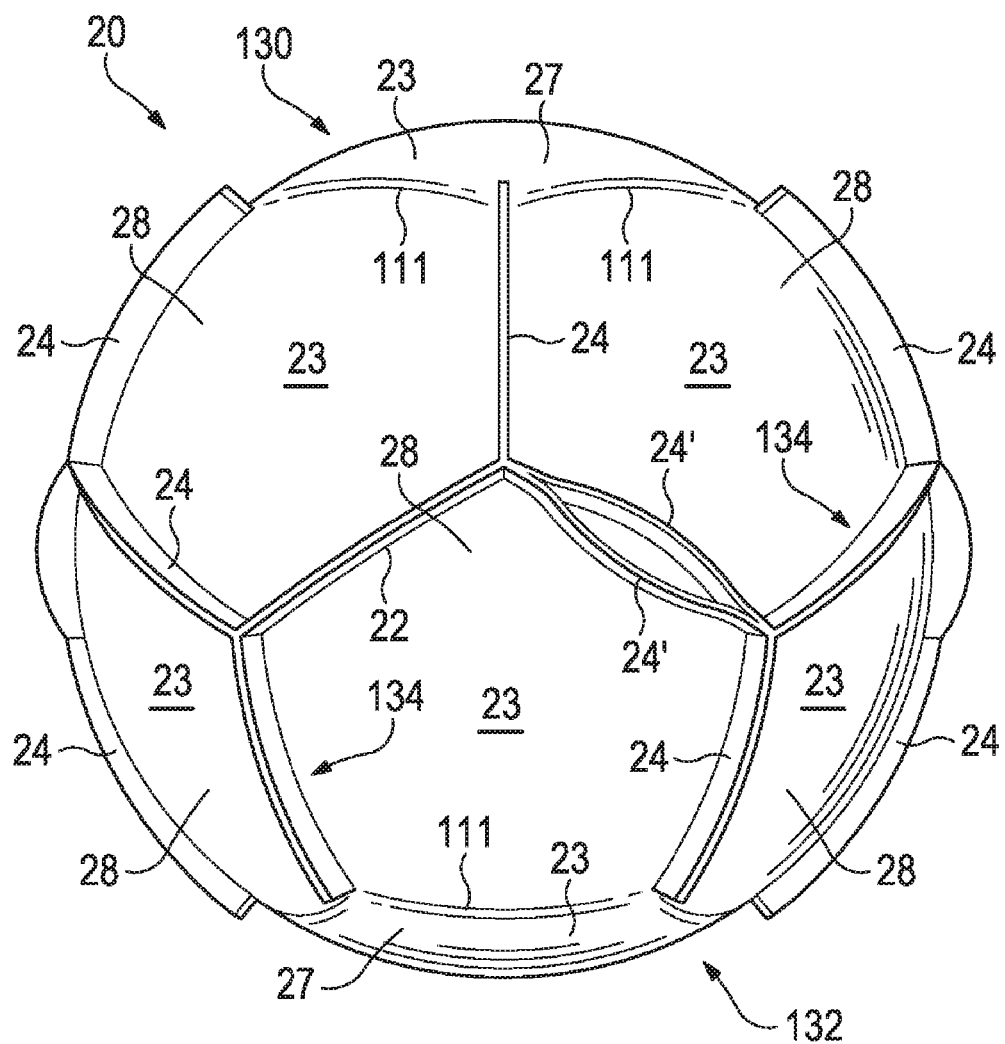
FIGS. 11A-11F are perspective views depicting further steps in the manufacturing process for the sport ball.
Figure 11B:
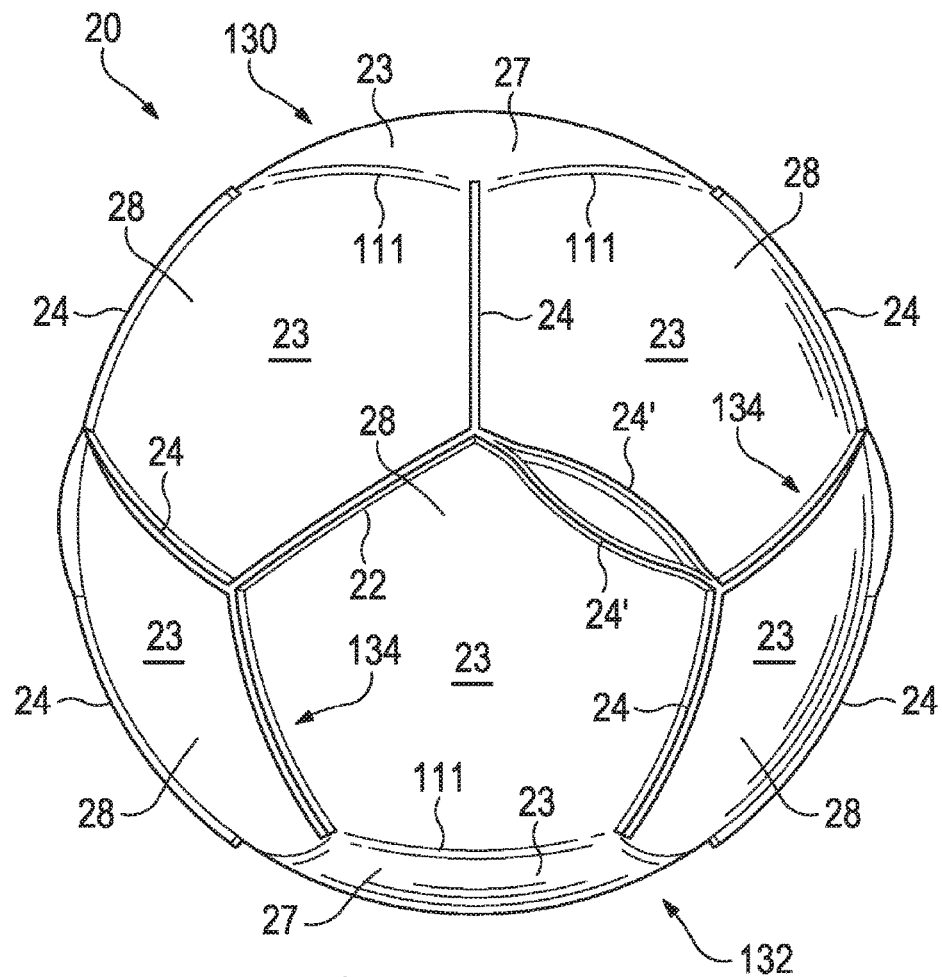

Once substantially hemispherical panel components 130 and 132 are formed by joining adjacent peripheral panels 28 on each of components 130 and 132, substantially hemispherical panel component 130 may be joined to substantially hemispherical panel component 132 by joining peripheral panels 28 of panel component 130 to peripheral panels 28 of panel component 132. Joining of substantially hemispherical panel components 130 and 132, to effectively form a generally spherical or closed structure, as depicted in FIG. 11A. That is, multiple panels 21 may be welded together through the general process discussed above in order to form various seams 22 in casing 20. FIG. 11A shows casing 20 inside-out, with flange areas outwardly exposed. Casing 20 may be assembled in this inside-out configuration in order to permit access to flange areas 24 to facilitate the welding process. A similar configuration is depicted in FIG. 11B, wherein flange areas 24 are trimmed. As discussed above, the trimming or removal of flange areas 24 may occur following the welding process or may occur at the time of the welding process.

Figure 11C:
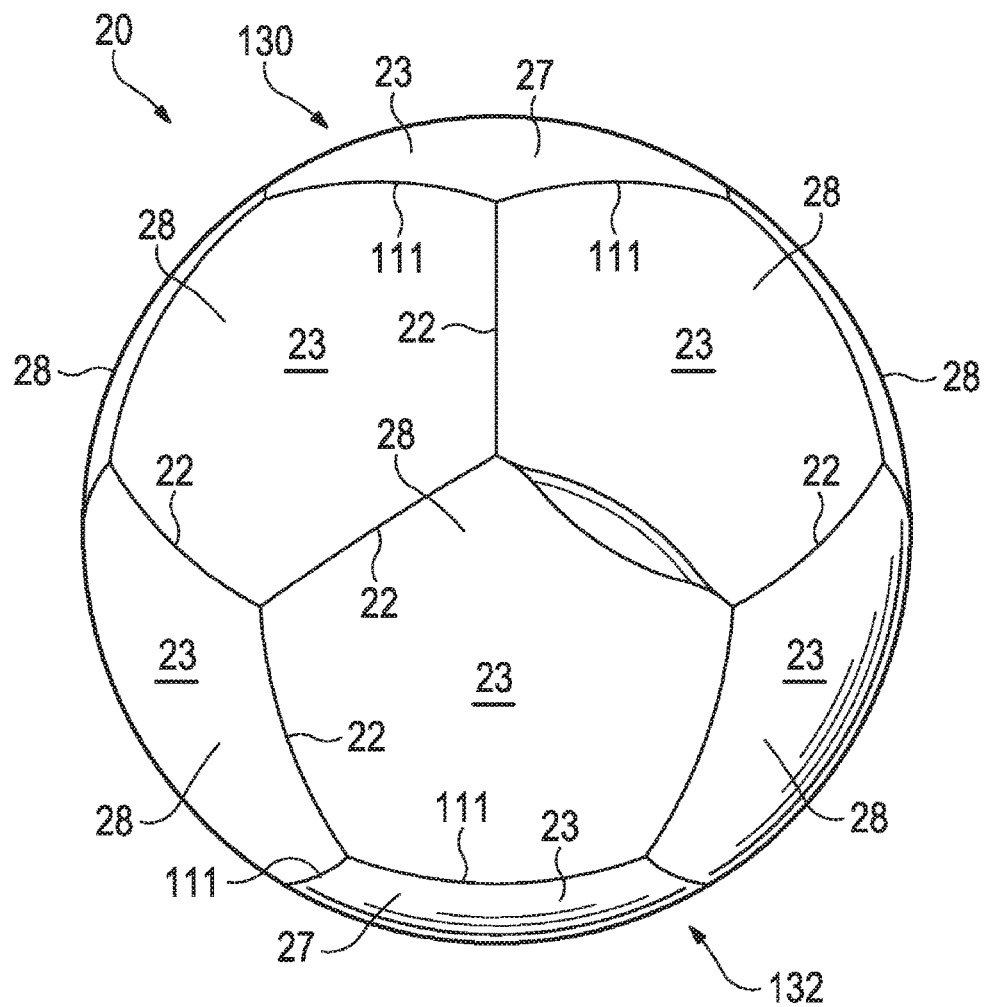

Although seams 22 are generally formed between each of flange areas 24, at least two flange areas 24 may remain unbonded to each other at this stage of the manufacturing process. Referring to FIGS. 11A and 11B, unbonded flange areas 24 are identified with reference numeral 24'. One purpose of leaving at least two flange areas 24 unbonded to each other is that casing 20 may be turned right side out through an opening formed between the unbonded flanges 24'. More particularly, the unbonded flange areas 24' may be separated to form an opening, as depicted in FIG. 11B, and casing 20 may be reversed or turned right-side-out through that opening to impart the configuration depicted in FIG. 11C. Whereas the trimmed portions of flange areas 24 protrude outward in FIG. 11B, reversing or turning casing 20 right-side-out through the opening between unbonded flange areas 24 places all of flange areas 24 within casing 20. Accordingly, the trimmed flange areas protrude inward, rather than outward, once casing 20 is reversed or turned right-side-out. The exterior of casing 20 may have a generally smooth configuration when portions of casing 20 corresponding with flange areas protrude inward. In some configurations, despite the generally smooth configuration of the exterior surface of casing 20, indentations may be formed on the exterior of ball 10 in the areas of seams 22. (See FIG. 3.) Similar indentations are commonly found in game balls with stitched seams.

Figure 11D:
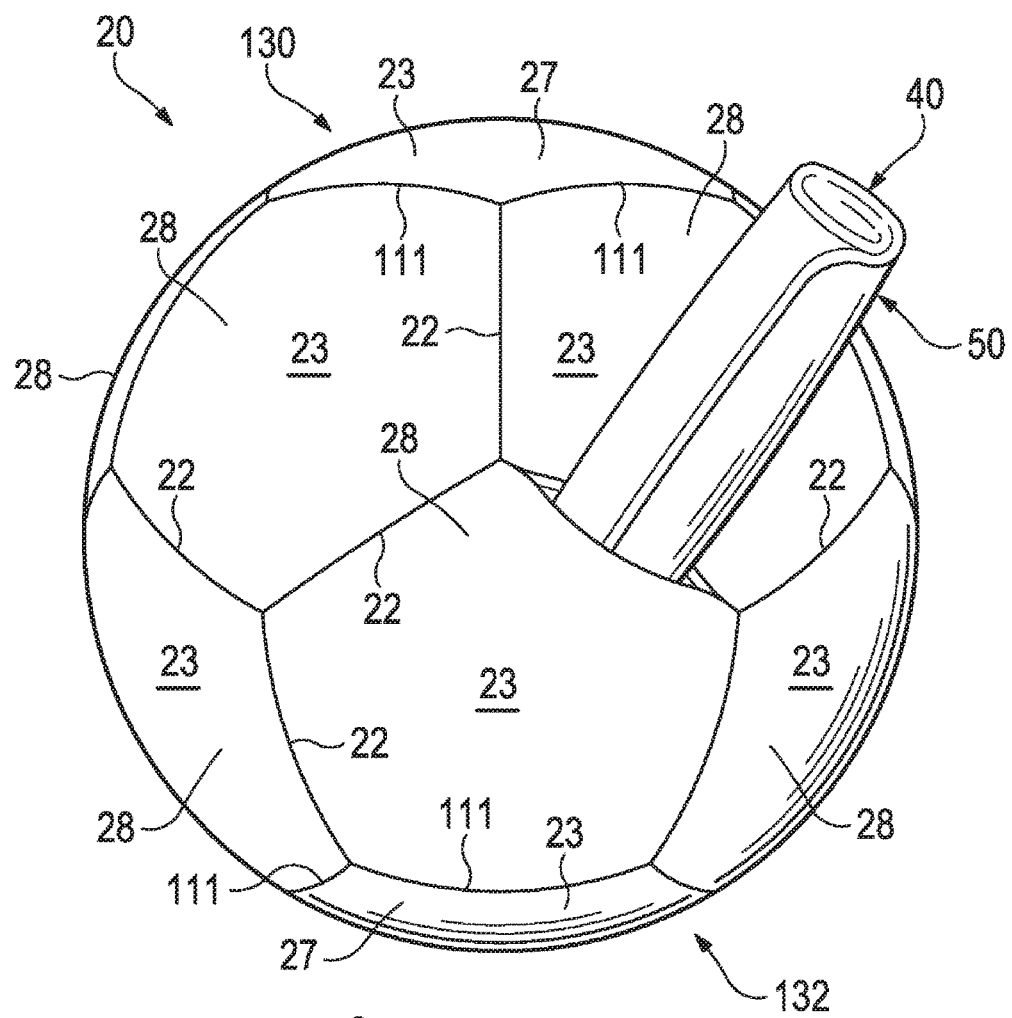

At this stage of the manufacturing process, casing 20 is substantially formed and the surfaces of casing 20 are correctly oriented. The opening in casing 20 formed between unbonded flange areas 24 may now be utilized to insert intermediate layer 50 and bladder 40, as depicted in FIG. 11D. That is, intermediate layer 50 and bladder 40 may be located within casing 20 through the opening that was utilized to reverse or turn casing 20 inside-out. Intermediate layer 50 and bladder 40 are then properly positioned within casing 20, which may include partially inflating bladder 40 to induce contact between surfaces of intermediate layer 50 and casing 20. Additionally, the valved opening (not depicted) of bladder 40 may be located to extend through intermediate layer 50 and casing 20, thereby being accessible from an exterior of ball 10.

Figure 11E:
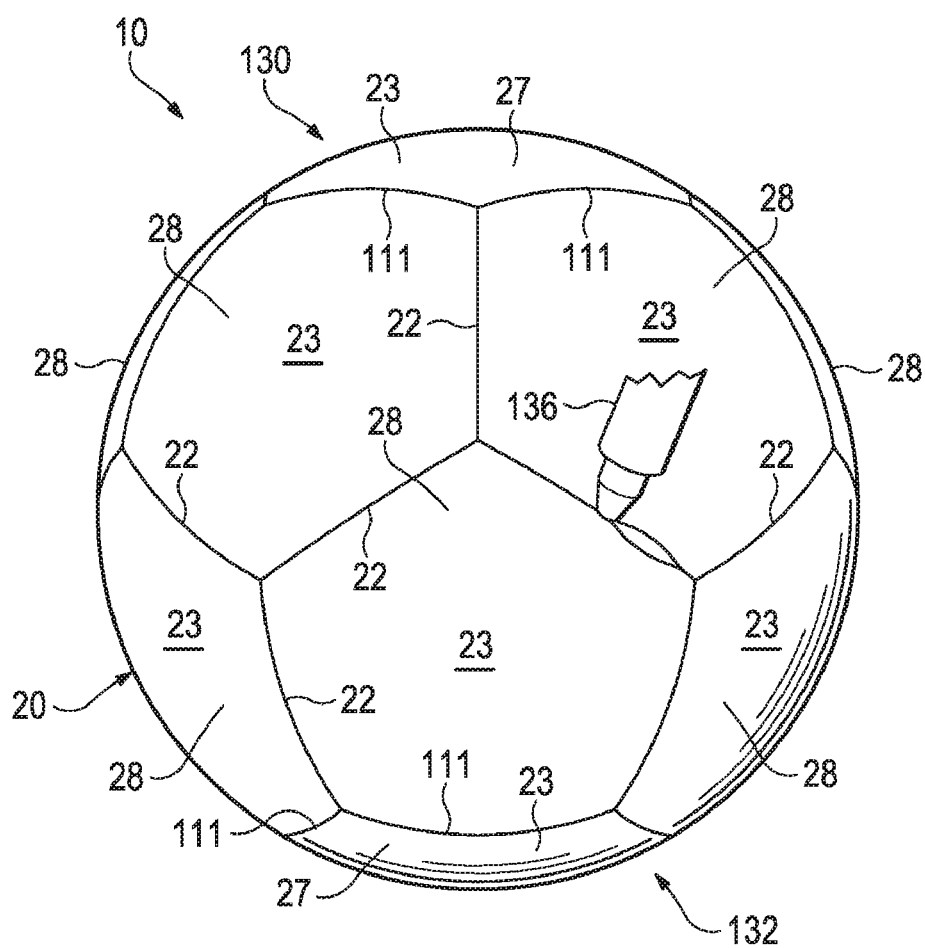
Figure 11F:
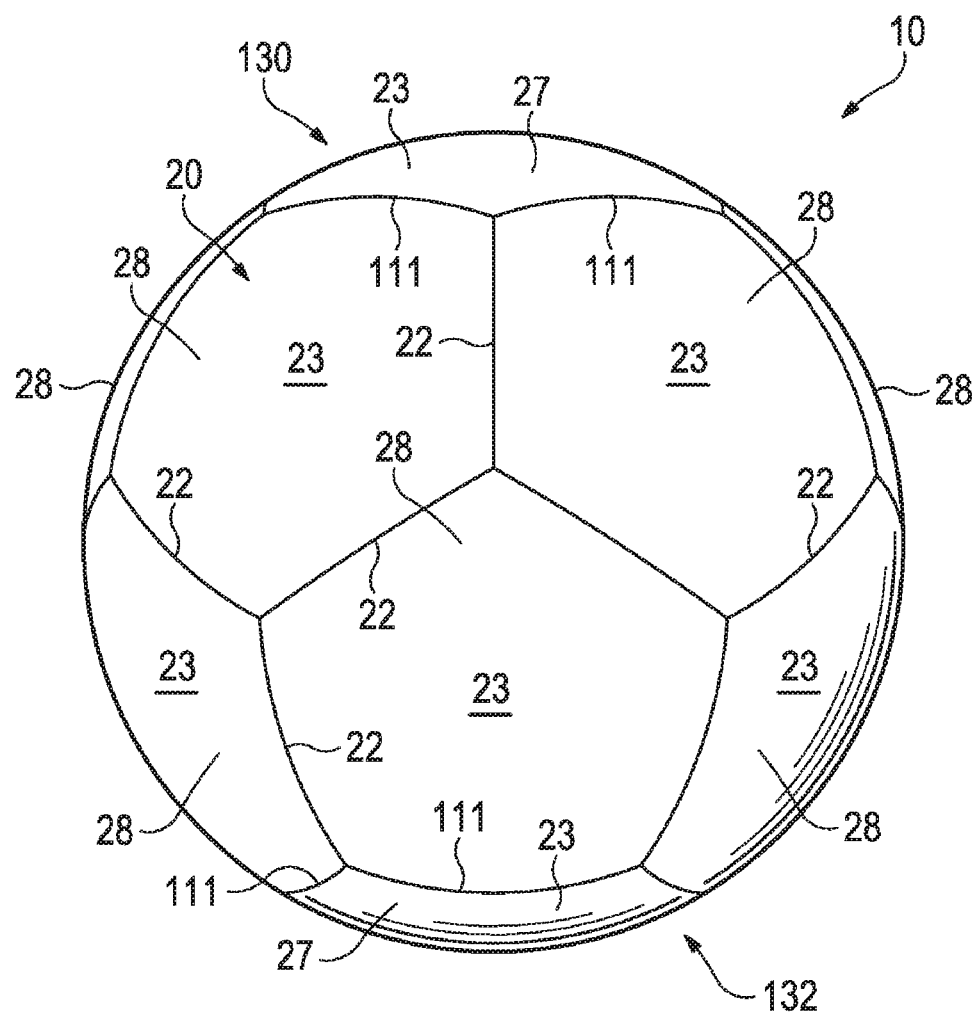

Once intermediate layer 50 and bladder 40 are properly positioned within casing 20, the opening in casing 20 formed between unbonded flange areas 24 may be sealed, as depicted in FIG. 11E. For example, a sealing die 136 may form a weld between the unbonded flange areas 24 to form a final seam 22 that effectively closes casing 20, thereby substantially completing the manufacturing process of ball 10, as depicted in FIG. 11F. As an alternative to welding, stitching or adhesives may be utilized to close casing 20.

Based upon the above discussion, casing 20 may be at least partially formed by joining panels 21 through a welding process. In comparison with other methods of joining panels, the welding process may reduce the overall mass of ball 10 and increase manufacturing efficiency. Once the welding process is utilized to join panels 21, an opening in casing 20 may be utilized to reverse or turn casing right-side-out to place protruding flange areas within ball 10, thereby forming a substantially smooth exterior surface. Additionally, intermediate layer 50 and bladder 40 may be inserted through the opening in casing 20, which is subsequently sealed.

Figure 12:
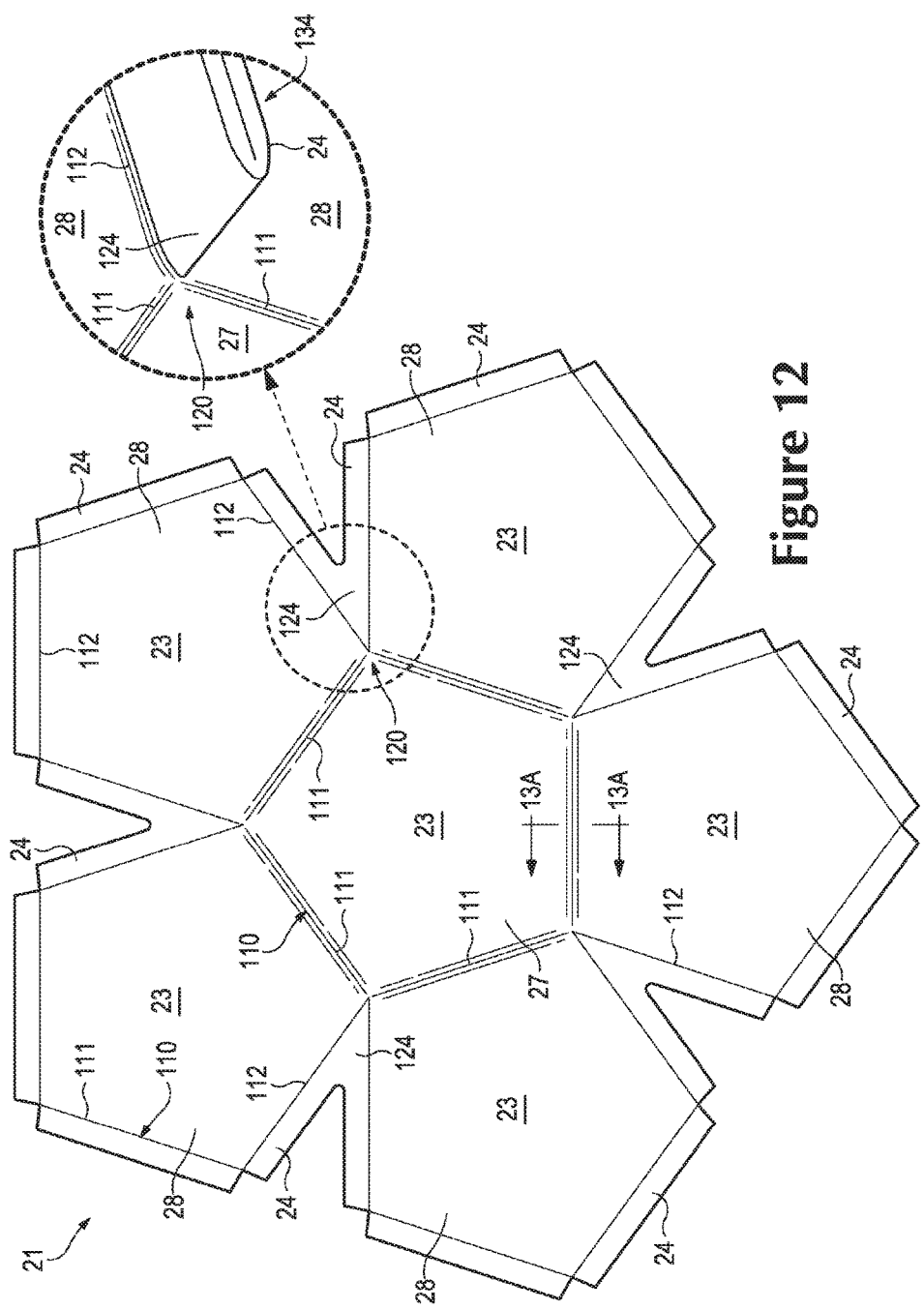
FIG. 12 is another perspective view of a panel component of the sport ball, and includes an enlarged view of a portion of the panel component.

FIG. 12 illustrates an enlarged view of vertex region 120, in particular showing the joinder of peripheral panels 28 with flange areas 24 including uncut area 124. As shown in FIG. 12, when flange areas 24 of peripheral panels 28 are joined together to form a joined flange area 134, uncut area 124 folds at the end of joined flange area 134 in vertex region 120. This configuration may ensure that joined flange area 134 is completely sealed and does not include any openings. This may be desired for purposes of water proofing and preventing debris from getting under casing 20 during use. Further such a fully sealed seam may provide additional strength, and resistance to tearing of casing 20 and/or resistance to the seam coming apart.

FIGS. 13A-13D illustrate exemplary configurations for indentations 110. In addition to the following details, further description and examples of such indentations are provided in U.S. patent application Ser. No. 12/959,886, filed Dec. 3, 2010, and entitled "Sport Ball with Indented Casing," the entire disclosure of which is incorporated herein by reference.

FIGS. 13A-13D show exemplary indentation configurations in a casing having three layers. For example, as shown in FIG. 13A-13D, casing 20 may include an outer layer 142, a middle layer 144, and an inner layer 146. Exemplary specifications for layers 142, 144, and 146 are discussed in detail above.

Figure 13A:
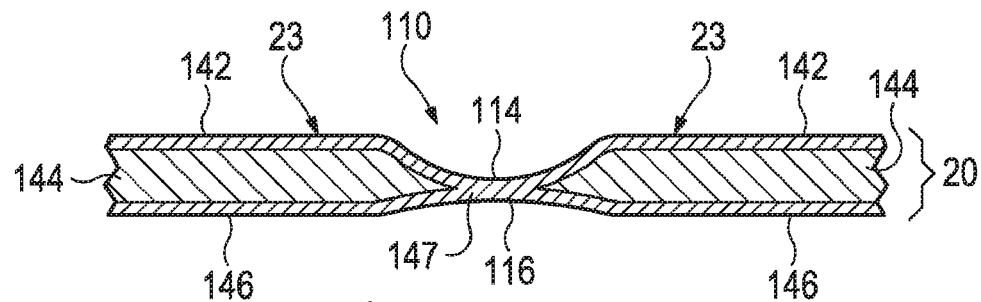
FIGS. 13A-13D are cross-sectional views of portions of a sport ball casing including indentations having various configurations.
Figure 13B:
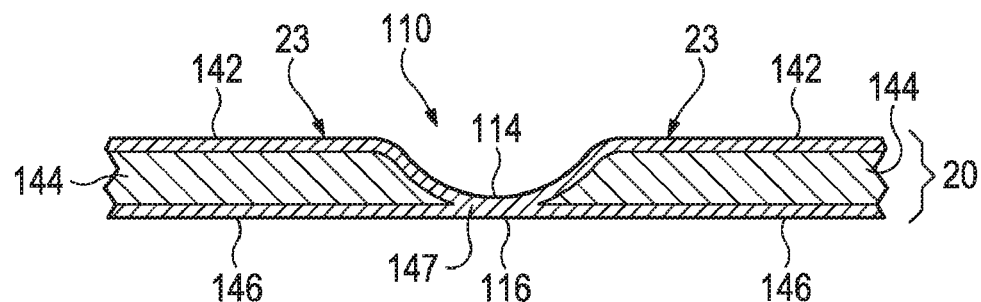
Figure 13C:
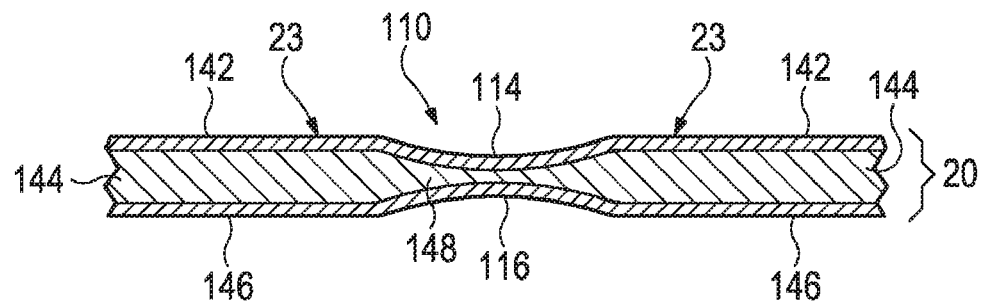
Figure 13D:
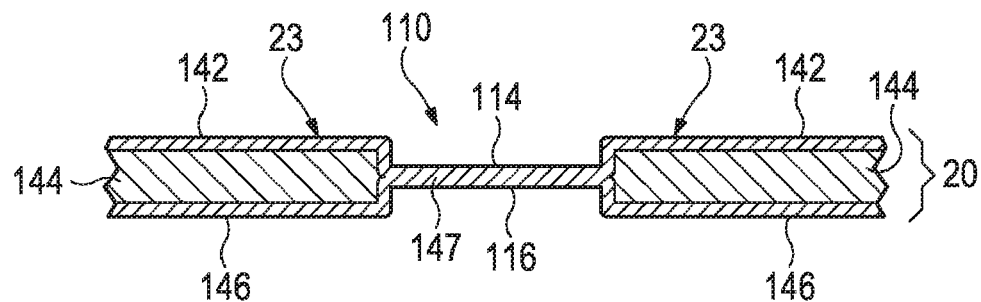

As illustrated in FIGS. 13A-13D, indentations 110 may include a compressed region wherein an outer layer 142 and an inner layer 146 of casing 20 are compressed toward one another, thus creating indentations 114 and 116. The configuration of indentations 114 and 116 may vary considerably. In some configurations indentations 114 and 116 may have a generally rounded configuration as shown in FIGS. 13A-13C. In other configurations, indentations 114 and 116 may have other shapes, such as rectangular, as shown in FIG. 13D.

In some configurations, indentations 114 may extend through more of the thickness of casing 20 than indentations 116, as shown in FIGS. 13A, 13B, and 13D. Further, as shown in FIG. 13B, in some configurations, indentations 114 may extend through substantially all of the thickness of casing 20. In other configurations, indentations 114 and 116 may both extend to an approximate midpoint of casing 20.

In some configurations, the compression of outer layer 142 and inner layer 146 may result in the melding of outer layer 142 and inner layer 146. In some cases, melding layers 142 and 146 may also result in the melding of middle layer 144. Exemplary such melded indentations 147 are shown in FIGS. 13A, 13B, and 13D. In other configurations, indentations 114 and 116 may be spaced from each other such that a portion 148 of middle layer 144 extends between outer layer 142 and inner layer 146, as shown in FIG. 13C. In this configuration, middle layer 144 may have (a) a first thickness between indentations 114 and 116 and (b) a second thickness in an area spaced from indentations 114 and 116, the first thickness being less than the second thickness. Accordingly, indentations 114 and 116 may have various configurations.

Based upon the above discussion, panels of casing 20 may incorporate indentations 110, which may have a design or appearance that enhances the aesthetics of ball 10. For example, in some configurations, indentations 110 may be arranged to resemble seams between panels, as discussed above. Further, in some configurations, indentations 110 may be arranged to form indicia, for example identifying the manufacturer of ball 10 or conveying information as to the features of ball 10. Additionally, indentations 110 may enhance the aerodynamics of ball 10 or provide an individual with greater control over ball 10 during kicking, dribbling, or passing, for example.

Figure 14A:
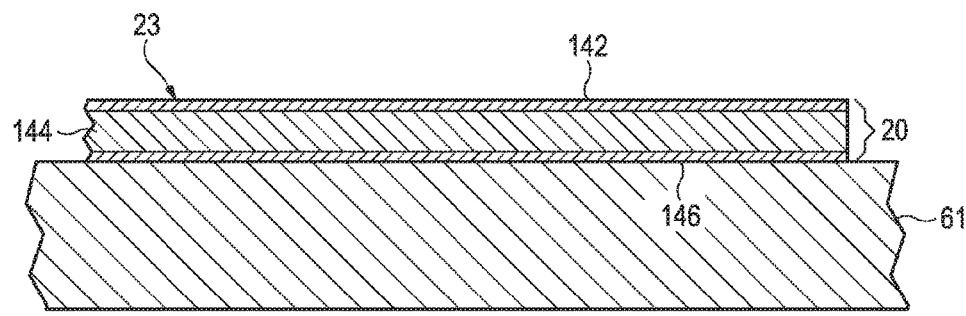
FIGS. 14A-14C show cross-sectional views of a method of creating indentations in a casing.
Figure 14B:
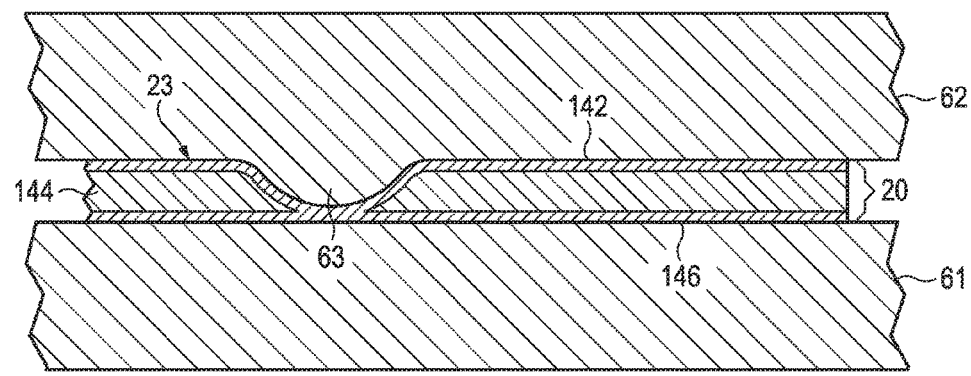
Figure 14C:
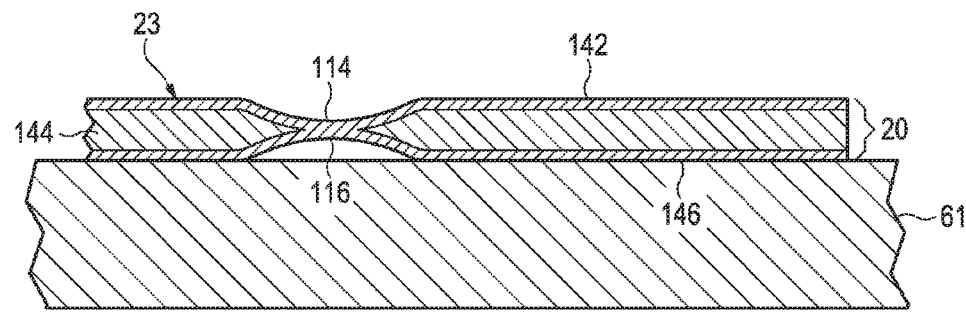

A variety of manufacturing processes may be utilized to form indentations 110, such as indentations 114 and 116, in casing 20. An example of a manufacturing process is depicted in FIGS. 14A-14C. Referring to FIGS. 14A and 14B, casing 20 may be located on a platen 61. A press plate 62 may be positioned above platen 61 and may include a protrusion 63. In some configurations, protrusion 63 may have a pentagonal shape (e.g., the shape of indentations 111 defining central panel 27). Press plate 62 may then be translated toward platen 61 to compress casing 20, as depicted in FIG. 14B. More particularly, protrusion 63 presses into and heats the areas of casing 20, forming indentations 114 and 116. As such, press plate 62 and protrusion 63 (a) soften a portion of middle layer 52, which may be formed form a polymer foam material and (b) bond outer layer 142 to inner layer 146, as depicted in FIG. 14C. Press plate 62 then moves away from casing 20 to substantially complete the formation of indentations 114 and 116.

When exposed to sufficient heat, the polymer materials within casing 20 transition from a solid state to either a softened state or a liquid state, particularly when a thermoplastic polymer material is utilized. When sufficiently cooled, the polymer materials then transition back from the softened state or the liquid state to the solid state. Based upon these properties, (a) the polymer material of outer layer 142 may soften to form a bond with the textile material of inner layer 146 and (b) the polymer foam material of middle layer 144 may melt, soften, part, collapse, or form an aperture that permits layers 142 and 146 to contact and bond with each other.

In order to properly heat the materials within casing 20, bonding apparatus 62 may emit heat when in contact with casing 20. In some configurations, resistive heating elements may be incorporated into press plate 62 to raise the temperature of casing 20 in the areas of indentations 114 and 116. Alternatively, high-frequency (HF) heating, radio frequency (RF) heating, or ultrasonic heating elements may be incorporated into press plate 62 and protrusion 63 to raise the temperature of casing 20 in the areas of indentations 114 and 116.

As an additional matter, the process disclosed above depicts protrusion 63 as pressing into one side of casing 20. That is, protrusion 63 presses into the side of casing 20 that includes outer layer 142. Although press plate 62 compresses outer layer 142 against inner layer 146, which lays against platen 61, indentation 116 forms in inner layer 53. More particularly, outer layer 142 is effectively placed in tension by the pressure from press plate 62. When the pressure from press plate 62 is removed, the tension in outer layer 142 pulls inner layer 53 toward the center of casing 20. Although protrusion 63 only presses into one side of casing 20, both indentations 114 and 116 are formed due to an equalization of forces in panel 21. Accordingly, both of indentations 114 and 116 may be formed by pressing into only one side of casing with press plate 62.

Further, it is envisaged that protrusions, such as protrusion 63 may be incorporated into a cutting apparatus (such as a die cutter or drag knife-type apparatus) used for cutting panel component 21. For example, the cutting apparatus may include protrusions configured to form indentations 111 that define central panel 27. Additionally, or alternatively, the cutting apparatus may include protrusions configured to form indentations 112 that separate flange areas 24 from peripheral panels 28. Accordingly, a die cutting apparatus may, in one stamping movement, die cut the shape of panel component 21, including the configuration of edge cuts in and around vertex regions 120, as well as form indentations 111 and 112. Similarly a drag knife-type apparatus may, with one dragging movement, form a precisely cut panel having indentations 111 and 112. Thus, in one stamping or dragging movement, a panel component 21 that is ready for assembly in a sport ball may be formed from a sheet of casing material. This may have the advantages of increasing manufacturing efficiency and reducing manufacturing costs.

Figure 15A:
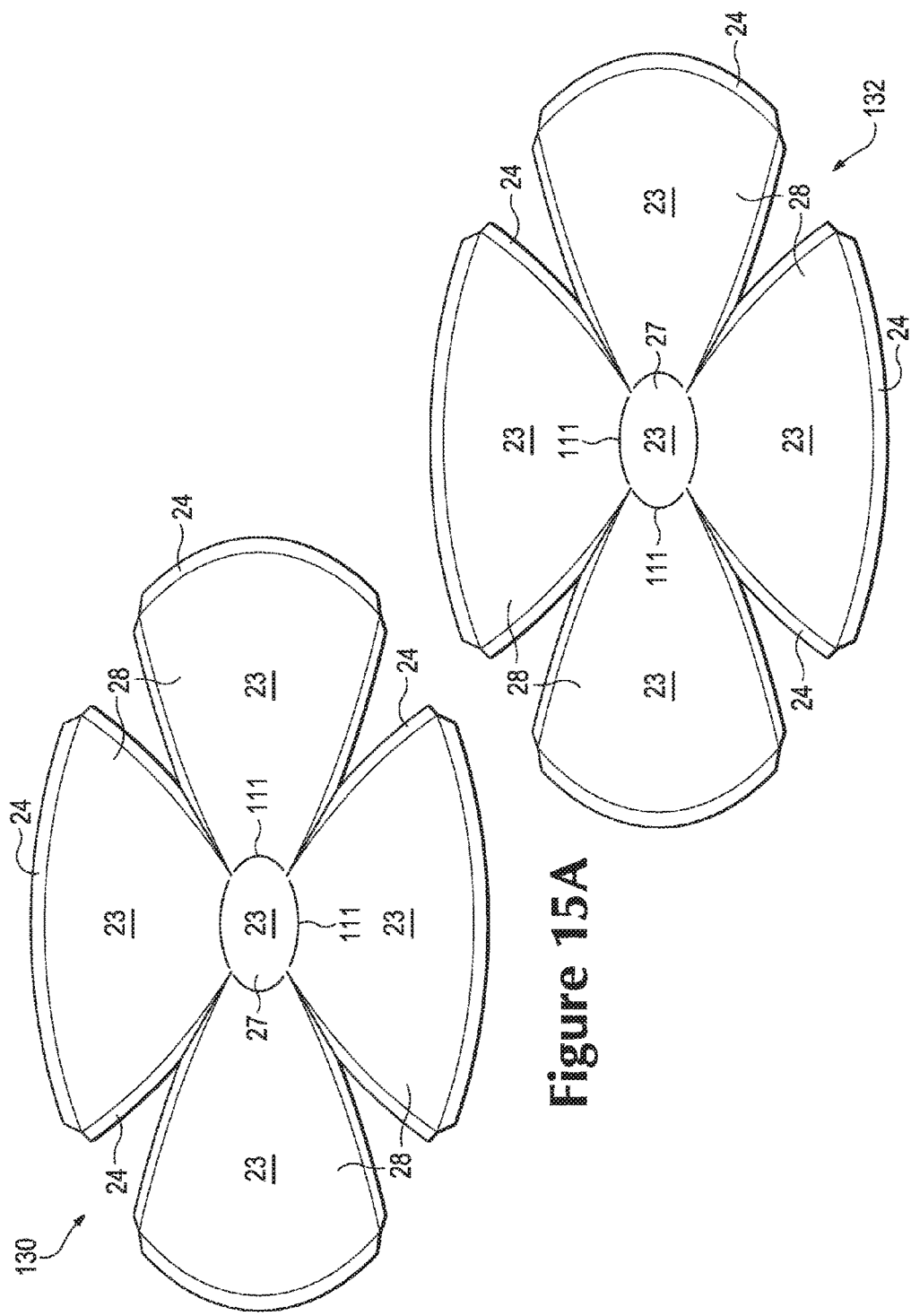
FIG. 15A is a perspective view of precut panel components having an alternative configuration.

FIG. 15A is a perspective view of precut panel components having an alternative configuration. As shown in FIG. 15A, a first panel component 130 and a second panel component 132 may be formed similarly to embodiments discussed above. For example, each of the panel components 130, 132 may include a central panel 27 and a plurality of peripheral panels 28. Central panel 27 may be separated from peripheral panels 28 by indentations 111 formed in a manner described above. Panel components 130 and 132 may also include flange portions 24 at edges of peripheral panels 28 to facilitate joinder of peripheral panels 28 to each other via attachment methods, such as welding. As shown in FIG. 15A, in some configurations, central panel 27 may have a circular shape.

In addition, as shown in FIG. 15B, peripheral panels may be configured to, in conjunction with central panel 27, form a substantially hemispherical configuration. With panel components 130, 132 formed into a substantially hemispherical configuration, adjacent peripheral panels 28 may be joined to each other, for example, via welding or another suitable joining technique. Joinder of peripheral panels may be facilitate by flange portions 24, as described above.

Figure 15C:
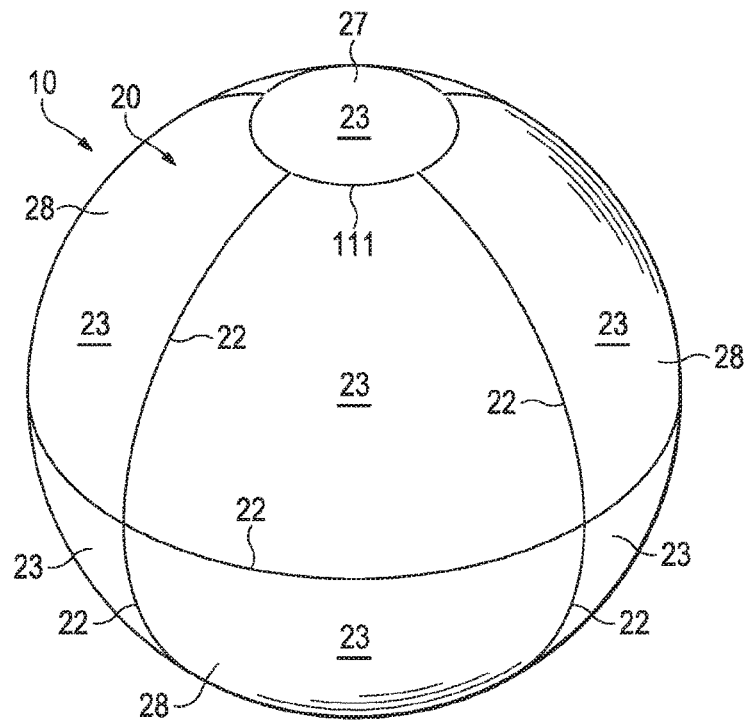
FIG. 15C shows a sports ball formed by the joining of the hemispherical panel components shown in FIG. 15B.

Once panel components 130 and 132 are formed into substantially hemispherical configurations and adjacent peripheral panels 28 of each panel component are joined, the panel components may be joined to each other, for example, by forming a substantially linear, equatorial seam, as shown in FIG. 15C. Utilizing a substantially linear, equatorial seam to joint panel components 130 and 132 may facilitate manufacturing by enabling the use of simpler joinder processes. That is, forming a linear seam may be simpler, faster, and less costly than forming a seam with a zigzag configuration.

Figure 15D:
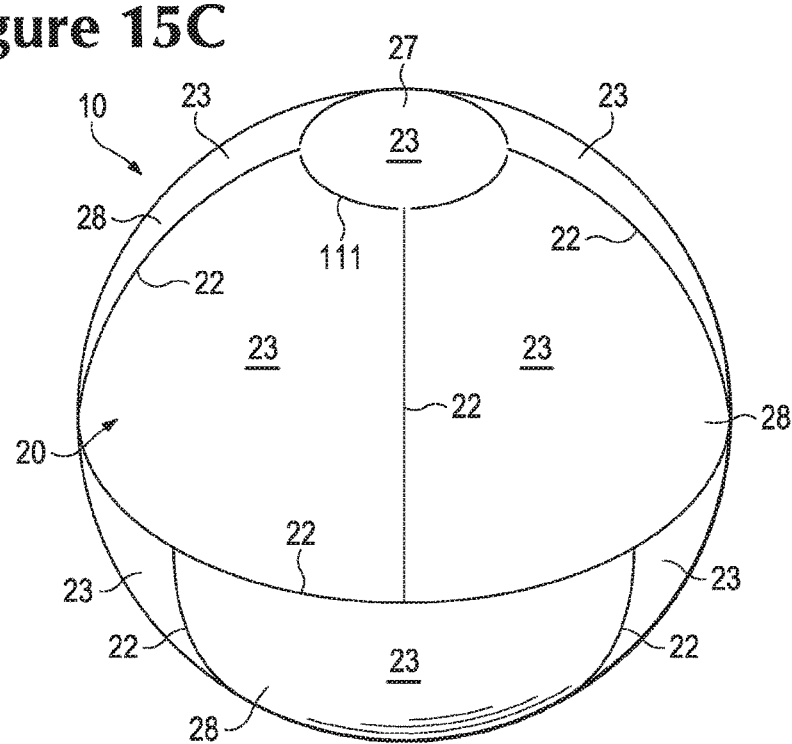
FIG. 15D shows a sports ball formed by the joining of the hemispherical components shown in FIG. 15B in an alternative alignment.

In the embodiment shown in FIG. 15C, ball 10 may be configured with seams 22 between adjacent peripheral panels 28 of panel component 130 in substantial alignment with seams 22 between adjacent peripheral panels 28 of panel component 132. However, in some embodiments, these seams may be arranged in substantial non-alignment. For example, as shown in FIG. 15D, seams 22 between peripheral panels 28 of panel components 130, 132 may be offset. Embodiments with aligned seams may be more efficient to manufacture, and may provide aesthetic appeal of continuous seams. Embodiments with non-aligned seams may also have aesthetic appeal, as the resulting overall panel configuration of ball 10 may be closer to a traditional soccer ball, and less like a beach ball. In addition, offset seams may provide increased structural integrity by separating potential weak points (seams) of the casing structure, although the welded seams described in the present application do not generally present themselves as lacking in strength. Nevertheless, manufacturing imperfections, such as seams where a weld is not fully completed may be less likely to fail if the seam does not follow a lengthy and substantially straight path over the surface of the ball. Further, in some configurations, offset seams may be evenly spaced, as shown in FIG. 15D. In other configurations, offset seams may be only slightly offset.

FIG. 16A is a perspective view of precut panel components having another alternative configuration. Like other embodiments described above, FIG. 16A shows panel components 130, 132, being formed of central panels 27 and peripheral panels 28. However, the embodiment shown in FIG. 16A employs only two peripheral panels on each central panel.

Figure 16C:
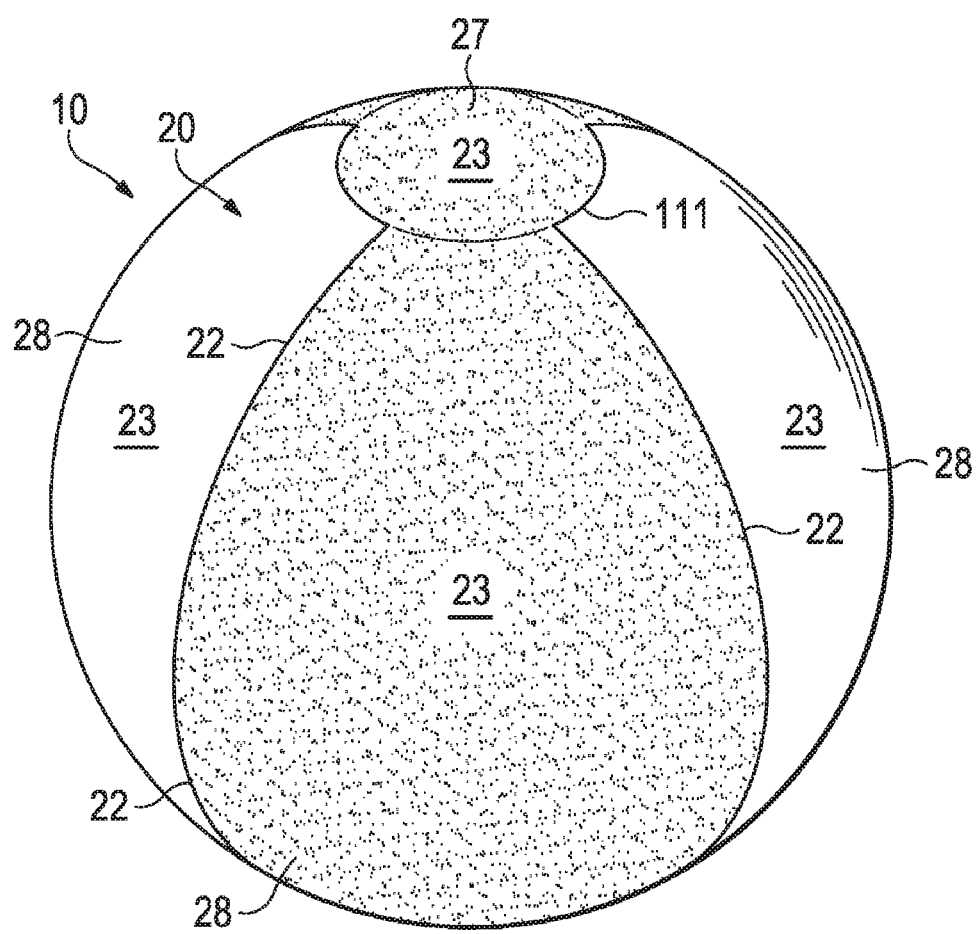
FIG. 16C shows a sports ball formed by the joining of the hemispherical panel components shown in FIG. 16B.

As shown in FIG. 16B, panel components 130, 132 may be curved to each form partially-spherical configurations. Then, as shown in FIG. 16C, panel components 130, 132 may be joined by connecting panels 23 to one another (e.g., by welding) to form seams 22. This arrangement of panels and seams may provide structural as well as aesthetic benefits that will be recognized by those having ordinary skill in the art. For example, this configuration omits an equatorial seam. Instead, seams 22 form a continuous, undulating path around the surface of ball 10. This may provide structural integrity, by spreading out potential weak portions (i.e., seams), although as noted above, seams 22 as described herein are not envisioned as being weak points.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims. Further, any of the features of any disclosed configuration may be incorporated or otherwise used with any of the other disclosed configurations.

The invention claimed is:

1. A method of making a spherical sport ball, the method comprising:
    forming a casing having a first substantially hemispherical panel component and a second substantially hemispherical panel component;
    wherein the first substantially hemispherical panel component is a first unitary structure and has:
        a first central panel;
        a first plurality of polygonal peripheral panels adjacent to the first central panel and having a first plurality of edges; and
        a plurality of flange areas extending from the first plurality of edges;
    wherein the second substantially hemispherical panel component is a second unitary structure and has:
        a second central panel; and
        a second plurality of polygonal peripheral panels adjacent to the second central panel; and
    joining together the first substantially hemispherical panel component and the second substantially hemispherical panel component at a non-linear, circumferential seam between the first plurality of polygonal peripheral panels and the second plurality of polygonal peripheral panels; and
    forming a vertex between adjacent ones of the plurality of flange areas.

2. The method of claim 1, wherein forming the vertex includes converging together adjacent ones of the plurality of flange areas.

3. The method of claim 1, wherein forming the vertex includes orienting the vertex to extend radially away from a center of the first central panel.

4. The method of claim 1, wherein forming the vertex includes defining a slit between the adjacent ones of the plurality of flange areas.

5. The method of claim 1, wherein forming the vertex includes tapering together the adjacent ones of the plurality of flange areas.

6. The method of claim 1, wherein forming the vertex includes cutting a stress relief opening between the adjacent ones of the plurality of flange areas.

7. The method of claim 1, wherein forming the vertex includes folding the adjacent ones of the plurality of flange areas upon one another.

8. The method of claim 1, wherein forming the vertex includes arranging the adjacent ones of the plurality of flange areas to be coextensive.

9. The method of claim 1, wherein forming the vertex includes sealing together the adjacent ones of the first plurality of polygonal peripheral panels without cutting the adjacent ones of the plurality of flange areas.

10. The method of claim 1, further including shaping the first central panel and the second central panel as a convex polygon.

11. The method of claim 1, further including shaping the first central panel and the second central panel as a convex pentagon.

12. The method of claim 1, further including shaping at least some of the first plurality of polygonal peripheral panels as a pentagon.

13. The method of claim 1, wherein joining includes welding together the first substantially hemispherical panel component and the second substantially hemispherical panel component.

14. A method of making a spherical sport ball, the method comprising:
    forming a first substantially hemispherical panel component, wherein the first substantially hemispherical panel component is a first unitary structure and has:
        a first central panel;
        a first plurality of polygonal peripheral panels adjacent to the first central panel and having a first plurality of edges; and
        a plurality of flange areas extending from the first plurality of edges;
    forming a second substantially hemispherical panel component, wherein the second substantially hemispherical panel component is a second unitary structure and has:
        a second central panel; and
        a second plurality of polygonal peripheral panels adjacent to the second central panel; and
    welding together the first substantially hemispherical panel component and the second substantially hemispherical panel component at a non-linear, circumferential seam between the first plurality of polygonal peripheral panels and the second plurality of polygonal peripheral panels such that adjacent ones of the plurality of flange areas abut one another;

impressing a plurality of elongated indentations in the first substantially hemispherical panel component to thereby form a first plurality of sides of the first central panel; and folding adjacent ones of the plurality of flange areas upon one another to thereby form a vertex between adjacent ones of the first plurality of polygonal peripheral panels.

15. The method of claim 14, wherein impressing the plurality of elongated indentations includes forming a plurality of seams between adjacent ones of the first plurality of polygonal peripheral panels.

16. The method of claim 15, further including bending the first substantially hemispherical panel component along at least one of the plurality of seams to thereby arrange the first central panel as a convex pentagon.

17. The method of claim 14, wherein impressing the plurality of elongated indentations includes compressing and heating the first substantially hemispherical panel component along a plurality of elongated regions.

18. The method of claim 14, wherein forming the first substantially hemispherical panel component includes cutting an entirety of the first substantially hemispherical panel component from a single sheet.

\* \* \* \* \*